(12) United States Patent
Bergamasco et al.

(10) Patent No.: US 7,734,808 B1
(45) Date of Patent: Jun. 8, 2010

(54) END-TO-END CONGESTION CONTROL IN A FIBRE CHANNEL NETWORK

(75) Inventors: Davide Bergamasco, Sunnyvale, CA (US); Claudio De Santi, San Jose, CA (US); Robert L. Hoffmann, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1842 days.

(21) Appl. No.: 10/777,886

(22) Filed: Feb. 11, 2004

Related U.S. Application Data

(63) Continuation-in-part of application No. 10/026,583, filed on Dec. 18, 2001, now Pat. No. 7,596,627.

(51) Int. Cl.
*G06F 15/16* (2006.01)

(52) U.S. Cl. .................. 709/235; 709/238; 709/234; 709/232; 709/213; 709/230; 370/429; 370/470; 370/412; 370/236; 370/229; 714/748; 714/749

(58) Field of Classification Search .............. 709/234, 709/235, 230, 232, 476, 213, 238
See application file for complete search history.

(56) References Cited

U.S. PATENT DOCUMENTS

| | | | |
|---|---|---|---|
| 5,617,421 A | 4/1997 | Chin et al. | |
| 5,675,742 A | 10/1997 | Jain | |
| 5,740,171 A | 4/1998 | Mazzola et al. | |
| 5,742,604 A | 4/1998 | Edsall et al. | |
| 5,764,636 A | 6/1998 | Edsall | |
| 5,809,285 A | 9/1998 | Hilland | |
| 5,970,048 A | 10/1999 | Pajvirta | |
| 5,999,930 A | 12/1999 | Wolff | |
| 6,035,105 A | 3/2000 | McCloghrie et al. | |
| 6,070,200 A | 5/2000 | Gates et al. | |
| 6,101,497 A | 8/2000 | Ofek | |
| 6,118,776 A | 9/2000 | Berman et al. | |
| 6,144,636 A | 11/2000 | Aimoto et al. | |
| 6,188,694 B1 | 2/2001 | Fine et al. | |

(Continued)

FOREIGN PATENT DOCUMENTS

CN 114170 A 1/1997

(Continued)

OTHER PUBLICATIONS

Japanese Office Action mailed Nov. 27, 2007 from Appln No. 2003-553792.

(Continued)

*Primary Examiner*—Jude J Jean Gilles
(74) *Attorney, Agent, or Firm*—Weaver Austin Villeneuve & Sampson LLP

(57) ABSTRACT

Methods and devices are provided for controlling congestion in a network such as a Fibre Channel network. According to some implementations, a node within a network fabric detects congestion caused by an edge device outside of the fabric and notifies the edge device of the congestion. The edge device applies a congestion reaction mechanism in response to the notification. In some implementations, the congestion reaction mechanism is applied on a per-exchange basis, in order to mitigate congestion caused by a particular operation.

26 Claims, 16 Drawing Sheets

U.S. PATENT DOCUMENTS

| | | | |
|---|---|---|---|
| 6,202,135 | B1 | 3/2001 | Kedem et al. |
| 6,205,145 | B1 | 3/2001 | Yamazaki |
| 6,208,649 | B1 | 3/2001 | Kloth |
| 6,209,059 | B1 | 3/2001 | Ofer et al. |
| 6,219,699 | B1 | 4/2001 | McCloghrie et al. |
| 6,226,771 | B1 | 5/2001 | Hilla et al. |
| 6,260,120 | B1 | 7/2001 | Blumenau et al. |
| 6,266,705 | B1 | 7/2001 | Ullum et al. |
| 6,269,381 | B1 | 7/2001 | St. Pierre et al. |
| 6,269,431 | B1 | 7/2001 | Dunham |
| 6,295,575 | B1 | 9/2001 | Blumenau et al. |
| 6,535,482 | B1 | 3/2003 | Salim et al. |
| 6,614,796 | B1 | 9/2003 | Black et al. |
| 6,675,220 | B1 | 1/2004 | Bergamasco et al. ........ 709/232 |
| 6,721,789 | B1 | 4/2004 | Demoney |
| 6,757,248 | B1 | 6/2004 | Li et al. |
| 6,970,424 | B2 * | 11/2005 | Fawaz et al. ................ 370/232 |
| 7,042,842 | B2 * | 5/2006 | Paul et al. ................... 370/229 |
| 7,061,909 | B2 | 6/2006 | Blanc et al. |
| 2003/0115355 | A1 * | 6/2003 | Cometto et al. ............ 709/234 |
| 2005/0025075 | A1 | 2/2005 | Dutt et al. |
| 2005/0047334 | A1 | 3/2005 | Aimoto et al. |

FOREIGN PATENT DOCUMENTS

| | | |
|---|---|---|
| EP | 0 647 081 A | 5/1995 |
| EP | 0 955 749 A | 4/1999 |
| JP | 9508764 T | 9/1997 |
| WO | WO 00/28706 | 5/2000 |

OTHER PUBLICATIONS

Canadian Office Action mailed Aug. 1, 2007 from Appln No. 2,469,803.

US Office Action mailed Jan. 9, 2008, from U.S. Appl. No. 10/026,583.

US Office Action mailed Aug. 24, 2007, from U.S. Appl. No. 10/026,583.

Australian Office Action, Application No. 2002359740, mailed Apr. 11, 2007.

Tamir Y, Frazier G., *High Performance Multi-Queue Buffers for VLSI Communications Switches*, Proc. of 15$^{th}$ Ann. Symp. On Comp. Arch., pp. 343-354, Jun. 1988.

Andrew S. Tenenbaum, *Computer Networks*, Third Edition ISBN 0-13-349945-6, © 1996 Prentice Hall.

US Office Action mailed Feb. 26, 2007, from U.S. Appl. No. 10/026,583.

US Office Action mailed Aug. 10, 2006, from U.S. Appl. No. 10/026,583.

US Final Office Action mailed Feb. 27, 2006 from U.S. Appl. No. 10/026,583.

US Office Action mailed Sep. 9, 2005 from U.S. Appl. No. 10/026,583.

"*Cisco MDS 9000 Family Configuration Guide Release 1.0(1)*", Corporate Headquarters Cisco Systems, Inc. [Online] Dec. 2002, XP002237525.

International Search Report, PCT/US 02/40513; Mailed May 12, 2003, 5 pages.

Chinese Office Action, Application No. 02828199.3, issued Mar. 7, 2008, by the State Intellectual Property of the People's Republic of China.

US Final Office Action mailed Aug. 24, 2008 from U.S. Appl. No. 10/026,583.

CN office action dated Jul. 31, 2009 in Chinese application No. 02828199.3.

Notice of Allowance and Fee Due mailed Feb. 13, 2009 from U.S. Appl. No. 10/026,583.

Allowed Claims from U.S. Appl. No. 10/026,583, Date= Feb. 13, 2009.

Japanese Decision of Final Rejection mailed Jul. 7, 2008, Application No. 2003-553792.

Canadian Office Action mailed Feb. 6, 2009, Application No. PCT/US 2,469,803.

English Translation of Publication No. 9-508764 by Japanese foreign associate, date=Sep. 2, 1997.

Electronic English Translation of publication No. 9-508764 from espace, Date= Sep. 2, 1997.

U.S. Office Action mailed Oct. 2, 2008, from U.S. Appl. No. 10/026,583.

\* cited by examiner

Figure 4

| Number Of Packets In Queue | Interval |
|---|---|
| 0-10 | --- |
| 11-15 | 260 |
| 16-31 | 132 |
| ... | ... |
| 112-127 | 6 |

403 / 405

401

411, 413, 415, 417, 419

END-TO-END CONGESTION CONTROL IN A FIBRE CHANNEL NETWORK

CROSS-REFERENCE TO RELATED APPLICATION

This application is a continuation-in-part of U.S. patent application Ser. No. 10/026,583, filed Dec. 18, 2001 now U.S. Pat. No. 7,596,627, which is hereby incorporated by reference for all purposes.

BACKGROUND OF THE INVENTION

1. Field of the Invention

The present invention relates to network congestion control. More specifically, the present invention relates to methods and apparatus for detecting congestion, generating instructions for alleviating congestion, distributing the instructions, and controlling congestion.

2. Description of Related Art

Many conventional network protocols use packet dropping to alleviate congestion at a network node. In one example, a network node in an IP-based network receives input data from multiple sources at a rate exceeding its output bandwidth. In conventional implementations, selected packets are dropped to allow transmission of remaining packets within the allocated output bandwidth. Packets can be dropped randomly or by using various selection criteria. The dropped packets are ultimately retransmitted under the control of a higher-level protocol such as TCP.

In networks such as Fibre Channel networks, packet dropping is generally not allowed. Instead, networks such as Fibre Channel networks implement end-to-end and buffer-to-buffer flow control mechanisms. End-to-end and buffer-to-buffer flow control mechanisms do not allow a first network node to transmit to a second network node until a second network node is ready to receive a frame. The second network node typically indicates that it is ready to receive a frame by granting credits to the first network node. When frames are transmitted, credits are used. When no credits remain, the first network node can no longer transmit to the second network node. However, the buffer-to-buffer flow control mechanism can significantly contribute to network congestion, as the mechanism blocks all traffic directed to a particular link subject to temporary over-subscription conditions. Such blocking can quickly propagate upstream to other links in a Fibre Channel network topology. Some of these links might serve as corridors for paths that do not include the originally congested link. Hence, congestion at one link of one network path can sometimes cause blocking over a much wider portion of a Fibre Channel topology.

It is therefore desirable to provide methods and apparatus for improving congestion control at networks nodes in a network such as a Fibre Channel network with respect to some or all of the performance limitations noted above.

SUMMARY OF THE INVENTION

Methods and devices are provided for controlling congestion in a network such as a Fibre Channel network. According to some implementations, a node within a network fabric detects congestion caused by an edge device outside of the fabric and notifies the edge device of the congestion. The edge device applies a congestion reaction mechanism in response to the notification. In some implementations, the congestion reaction mechanism is applied on a per-exchange basis, in order to mitigate congestion caused by a particular operation.

Some implementations of the invention provide a method for controlling network congestion. The method includes the steps of receiving, at an edge device that is in communication with a Fibre Channel network fabric but is not part of the fabric, a frame having the following: a source identifier corresponding to a destination node the edge device transmitting traffic to; a destination identifier corresponding to the edge device; an exchange identifier corresponding to an exchange being transmitted by the edge device to the destination node; and an instruction from a node within the Fibre Channel network to the edge device, the instruction indicating that an exchange originated by the edge device is causing network congestion. The method also includes the step of implementing a congestion reaction mechanism at the edge device in accordance with the instruction. The instruction may pertain to the exchange being transmitted by the edge device to the destination node. The congestion reaction mechanism may be applied to the exchange being transmitted by the edge device to the destination node.

Alternative implementations of the invention provide a method for controlling network congestion. The method includes the step of receiving, at a network device that is part of a Fibre Channel network device fabric, a frame having the following: a source identifier corresponding to a source node, the source node comprising an edge device outside the Fibre Channel network device fabric; a destination identifier corresponding to a destination node; and an exchange identifier corresponding to an exchange being transmitted by the source node to the destination node. The method also includes the steps of characterizing traffic flow at the Fibre Channel network device and sending an instruction from the Fibre Channel network device to the source node.

The instruction may be an Edge Quench message. The instruction may have a source identifier field corresponding to the destination node, a destination identifier field corresponding to the source node, and an exchange identifier field corresponding to the exchange identifier field. The instruction may contain network device congestion information and/or network device queue level information. The instruction may direct the source node to reduce a rate of transmission. The exchange of which the rate of transmission is to be reduced may be identified by an exchange identifier field of the instruction.

Other implementations of the invention provide a method for controlling traffic flow between a first end node and a second end node through an intermediate node that is part of a Fibre Channel switch fabric. The first end node and the second end node are outside the Fibre Channel switch fabric. The method includes the step of transmitting a first frame having a source identifier corresponding to the first end node, a destination identifier corresponding to a second end node and an exchange identifier corresponding to a particular exchange being transmitted by the first end node to the second end node. The method includes the step of receiving a second frame from the intermediate node. The second frame has a source identifier corresponding to the second end node, a destination identifier corresponding to the first end node, and an exchange identifier corresponding to the exchange identifier of the first frame. The second frame also includes instructions to adjust a current allowed rate for the exchange corresponding to the exchange identifier being transmitted from the first end node to the second end node. The method also includes the step of adjusting the current allowed rate for the particular exchange from the first end node to the second end node according to the instructions.

The adjusting step may be performed by the first end node. The current allowed rate may be limited to a maximum allowed rate. The method may also include the step of determining that the second frame contains an Edge Quench instruction. The adjusting step may involve decreasing the current allowed rate according to a decrease function. The adjusting step may involve increasing the current allowed rate according to an increase function. The increase function may be dynamically set and may be based on a state of a queue associated with the intermediate node.

Some embodiments of the invention provide a device for controlling network congestion. The device includes an apparatus for receiving, at an edge device that is in communication with a Fibre Channel network fabric but is not part of the fabric, a frame having the following: a source identifier corresponding to a destination node; a destination identifier corresponding to the edge device; and an exchange identifier corresponding to an exchange being transmitted by the edge device to the destination node; and an instruction from a node within the Fibre Channel network device to the edge device, the instruction indicating that an exchange originated by the edge device is causing network congestion. The device also includes an apparatus for implementing a congestion reaction mechanism at the edge device in accordance with the instruction.

Alternative embodiments of the invention provide another device for controlling network congestion. The device includes a mechanism for receiving, at a network device that is part of a Fibre Channel network fabric, a frame having the following: a source identifier corresponding to a source node, the source node comprising an edge device outside the Fibre Channel network device fabric; a destination identifier corresponding to a destination node; and an exchange identifier corresponding to an exchange being transmitted by the source node to the destination node. The device also includes a mechanism for characterizing traffic flow at the Fibre Channel network device and a mechanism for sending an instruction from the Fibre Channel network device to the source node.

Some embodiments of the invention provide yet another device for controlling network congestion. The device includes a port for receiving, at a network device that is part of a Fibre Channel network fabric, a frame having the following: a source identifier corresponding to a source node, the source node comprising an edge device outside the Fibre Channel network device fabric; a destination identifier corresponding to a destination node; and an exchange identifier corresponding to an exchange being transmitted by the source node to the destination node. The device also includes at least one processor configured to characterize traffic flow at the Fibre Channel network device and to send a frame containing an instruction from the Fibre Channel network device to the source node.

Still other embodiments of the invention provide a host bus adaptor for controlling network congestion. The host bus adaptor includes a first connection for communicating with a Fibre Channel network device and configured to receive frames comprising the following: a source identifier corresponding to a destination node; a destination identifier corresponding to the edge device; an exchange identifier corresponding to an exchange being transmitted by the edge device to the destination node; and an instruction from a node within the Fibre Channel network device to the edge device, the instruction indicating that an exchange originated by the edge device is causing network congestion. The host bus adaptor also includes a second connection for communicating with a bus of the edge device and at least one processor for implementing a congestion reaction mechanism at the edge device in accordance with the instruction.

Yet other embodiments of the invention provide a computer program embodied in a machine-readable medium. The computer program includes instructions for controlling one or more devices to alleviate network congestion by performing the following steps: (1) receiving, at an edge device that is in communication with a Fibre Channel network fabric but is not part of the fabric, a frame having the following: a source identifier corresponding to a destination node; a destination identifier corresponding to the edge device; an exchange identifier corresponding to an exchange being transmitted by the edge device to the destination node; and an instruction from a node within the Fibre Channel network device to the edge device, the instruction indicating that an exchange originated by the edge device is causing network congestion; and (2) implementing a congestion reaction mechanism at the edge device in accordance with the instruction.

The instruction may pertain to the exchange being transmitted by the edge device to the destination node. The congestion reaction mechanism may be applied to the exchange being transmitted by the edge device to the destination node.

Other aspects of the invention provide a computer program embodied in a machine-readable medium. The computer program includes instructions for controlling one or more devices to alleviate network congestion by performing the following steps: (1) receiving, at a network device that is part of a Fibre Channel network fabric, a frame having the following: a source identifier corresponding to a source node, the source node comprising an edge device outside the Fibre Channel network device fabric; a destination identifier corresponding to a destination node; and an exchange identifier corresponding to an exchange being transmitted by the source node to the destination node; (2) characterizing traffic flow at the Fibre Channel network device; and (3) sending an instruction from the Fibre Channel network device to the source node.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

FIG. 4 is a table showing how frequently quench messages can be generated based on buffer levels.

DETAILED DESCRIPTION OF SPECIFIC EMBODIMENTS

The present invention relates to controlling congestion in a network. More specifically, the present invention relates to methods and apparatus for transmitting congestion notification messages from a congested network node to other network nodes to control the traffic flow to the congested network node.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Fibre Channel used in a storage area network. However, it should be noted that the techniques of the present invention can be applied to a variety of different protocols and networks. Further, the solutions afforded by the invention are equally applicable to non-Fibre Channel networks. In one example, the techniques can apply to networks that generally do not allow packet dropping, although the techniques of the present invention can apply to a variety of different networks including IP networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Methods and apparatus are provided for alleviating congestion at a network node. The congestion in any network can lead to delays in transmitting various types of data and reduction of throughput. In particular, congestion at a network node using Fibre Channel can be particularly deleterious because effects such as cascading congestion and head-of-line blocking, described further below, can be introduced into the network. Consequently, techniques are provided for detecting and characterizing the congestion at a network node. Different types of instructions to control traffic flow to the congested network node can then be generated and transmitted with information characterizing the congestion at the network node. Some other network nodes receiving the instructions use information provided in the instructions to selectively control traffic flow towards the congested network node.

Figure 1:
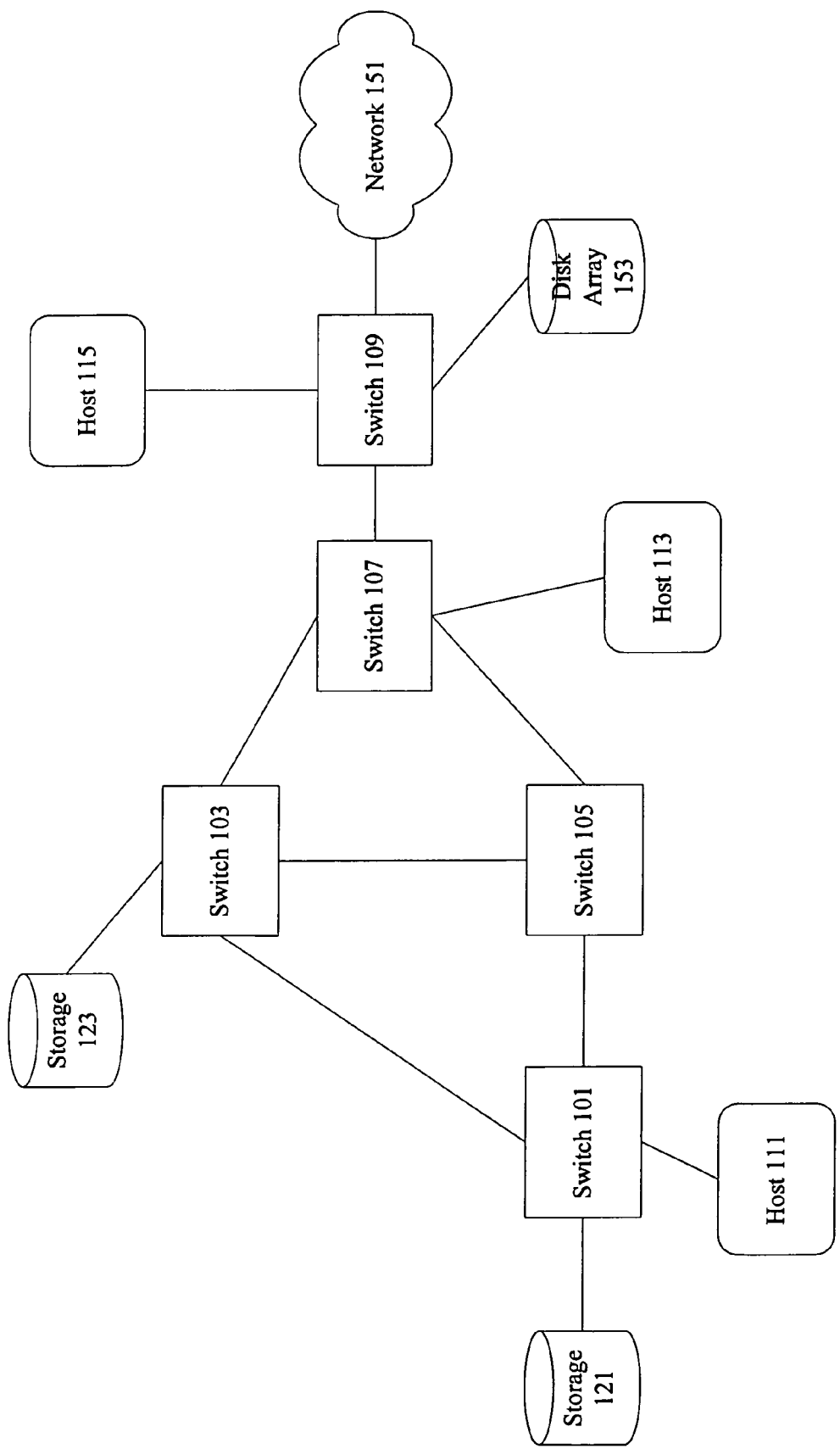
FIG. 1 is a diagrammatic representation of a network that can use the techniques of the present invention.

FIG. 1 is a diagrammatic representation of a network that can use the techniques of the present invention. Although the techniques of the present invention will be discussed in the context of Fibre Channel in a storage area network, it should be noted as indicated above that the techniques of the present invention can be applied to a variety of contexts including various local and wide area networks. Various techniques can be applied in any network where a single network node can act as a point of congestion for multiple flows or paths. FIG. 1 shows a storage area network implemented using Fibre Channel. A switch 101 is coupled to switches 103 and 105 as well as to a host 111 and storage 121. In one embodiment, host 111 may be a server or client system while storage 121 may be single disk or a redundant array of independent disks (RAID). Interconnected switches 103 and 105 are both coupled to switch 107. Switch 107 is connected to host 113 and switch 103 is connected to storage 123. Switch 109 is connected to host 115, switch 107, disk array 153, and an external network 151 that may or may not use Fibre Channel. In order for a host 111 to access network 151, several paths may be used. One path goes through switch 103 while another path goes through switch 105. However, congestion at switch 109 can slow down communication between a host 111 and a network 151.

As noted above, when a switch or router in a conventional IP network is congested, packets are dropped. Packets may be dropped randomly or selectively dropped with some degree of intelligence. By dropping packets, flows that were consuming a large amount of bandwidth will generally have more packets dropped than flows that were consuming a smaller amount of bandwidth. Although flow rates through the congested switch or router will be reduced with the dropping of packets, packets will get through the switch 109 to network 151. Congestion at switches 103 and 105 is not introduced because of congestion at switch 107 or switch 109.

Fibre channel, however, does not allow the dropping of packets. Instead, when a switch 109 is congested because of various reasons such as the failure or inability of a network 151 to receive more frames, a buffer-to-buffer credit mechanism is used to control traffic flow from switch 107 to switch 109. In typical implementations, a switch 109 allocates a predetermined number of credits to switch 107. Every time the switch 107 transmits frames to switch 109, credits are used. A switch 109 can then allocate additional credits to switch 107 when the switch 109 has available buffers. When a switch 107 runs out of credits, it can no longer transmit to switch 109. Because of the failure or inability of a network 151 to receive more frames, switch 109 and consequently switch 107 cannot transmit to network 151. It should be noted that although network 151 is described as a point of congestion in one embodiment, in other embodiments, a disk array 153 or a host 115 may be a source of congestion.

A buffer-to-buffer credit mechanism is a very rough way of reducing traffic flow to a switch 109. The credit mechanism not only prevents traffic from traveling from switch 107 to switch 109 and subsequently to network 151, but it also prevents traffic from flowing from switch 107 to switch 109 to host 115 even though host 115 and its associated link may have the bandwidth to receive additional frames from switch 109. The buffer-to-buffer credit mechanism can result in the blocking of traffic traveling to an uncongested destination such as host 115. In one example, a host 111 may be communicating with a congested network 151. Because of the congestion in network 151, switch 109 queues a large number of frames from host 111 and consequently uses the buffer-tobuffer credit mechanism to prevent switch 107 from transmitting any more frames whether the frames are from a host 111 or a host 113.

A host 113, on the other hand, may be merely attempting to transmit a few frames to a host 115. Because network congestion causes switch 109 to implement the buffer-to-buffer credit mechanism between switch 107 and switch 109, no frames can travel from host 113 to host 115 through the link connecting switch 107 and switch 109 even though the true point of congestion is the network 151. Frames can no longer be transmitted to host 115 or to network 151 because of congestion in the network 151 or disk array 153.

It should be noted that frames are generally layer two constructs that include the layer three packet constructs. Frames and packets will generally be used interchangeably herein to describe network transmissions. It should also be noted that although the point of congested here is the network 151, other contemplated points of congestion can be a host 115 or a disk array 153 connected to a switch 109.

Because switch 107 can no longer transmit to switch 109, switch 107 may have to implement the same buffer-to-buffer credit mechanism with switches 103 and 105. When switches 103 and 105 can no longer transmit to switch 107, switches 103 and 105 may have to implement an buffer-to-buffer credit mechanism with switch 101. Congestion consequently can cascade throughout the network. The cascading congestion phenomenon can be referred to as congestion spreading.

Figure 2:
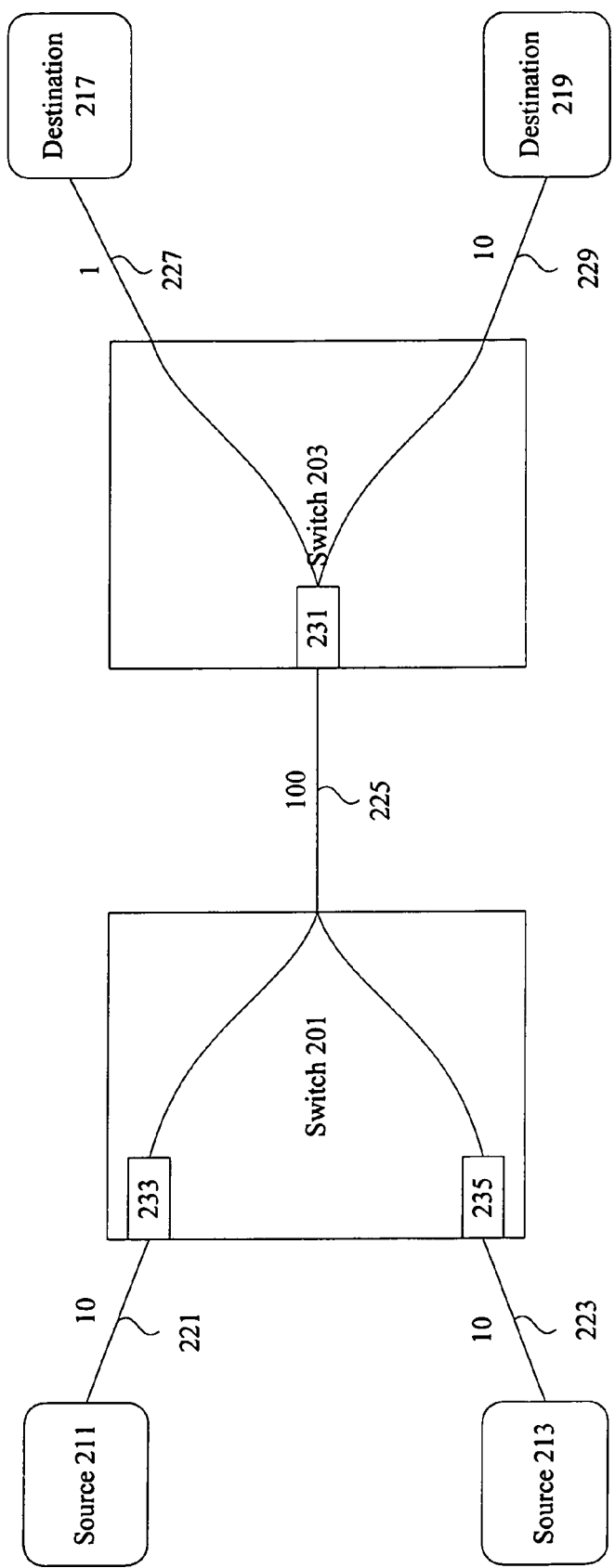
FIG. 2 is a diagrammatic representation showing head-of-line blocking.

FIG. 2 is diagrammatic representation of a simplified network depicting head-of-line blocking. In FIG. 2, source node 211 is transmitting data to destination node 217 through switches 201 and 203. Source node 213 is transmitting data to destination node 219 through switches 201 and 203. It should be noted that source nodes 211 and 213 as well as destination nodes 217 and 219 can be entities such as switches, hosts, external networks, or disks. In one example, links 221, 223, and 229 each allow transmission at 10 bytes per second. Link 225 allows transmission at 100 bytes per second. Link 227, however, only allows transmission at one byte per second. If both source node 211 and source node 213 are transmitting to respective destinations 217 and 219 at 10 bytes per second, congestion will result at switch 203 because link 227 can only transmit at one byte per second. Packets or frames from source node 211 will accumulate at switch 203 because switch 203 cannot transmit at a sufficient rate to destination 217. Switch 203 has a shared memory 231 associated with link 225. Switch 201 has shared memory 233 and shared memory 235 associated with links 221 and 223 respectively. More detail on shared memory and congestion characteristics of each switch will be provided with reference to FIG. 3A below.

In shared memory implementations, switch 203 has a shared memory 231 for all traffic arising from link 225. This shared memory 231 can contain packets and frames destined for either destination node 217 or destination node 219. If packets or frames destined for destination node 217 fill the shared memory associated with switch 203, frames destined for either destination node 217 or destination node 219 can no longer be accepted at switch 203. A switch 203 can then block additional incoming traffic by using the buffer-to-buffer credit mechanism. The buffer-to-buffer credit mechanism slows traffic flowing not only along congested path from source 211 to destination 217 but also traffic along originally noncongested path from source 213 to destination 219. As a result of the slowed traffic, even though the bandwidth on link 225 is more than adequate to transfer traffic between node 213 and node 219, node 213 will be able to transfer only 1 byte per second to node 219.

The techniques of the present invention provide mechanisms for detecting congestion and generating instructions that can reduce traffic on flows along congested paths while continuing to allow other traffic flow. The techniques of the present invention attempt to avoid the invocation of standard buffer-to-buffer credit mechanisms that indiscriminately block traffic regardless of destination. Indiscriminate blocking can occur frequently in Fibre Channel networks as varying Fibre Channel standards exist. In one example, one line may be configured to handle 1 gigabit per second while another line may be configured to handle 2 or 10 gigabits per second.

Figure 3A:
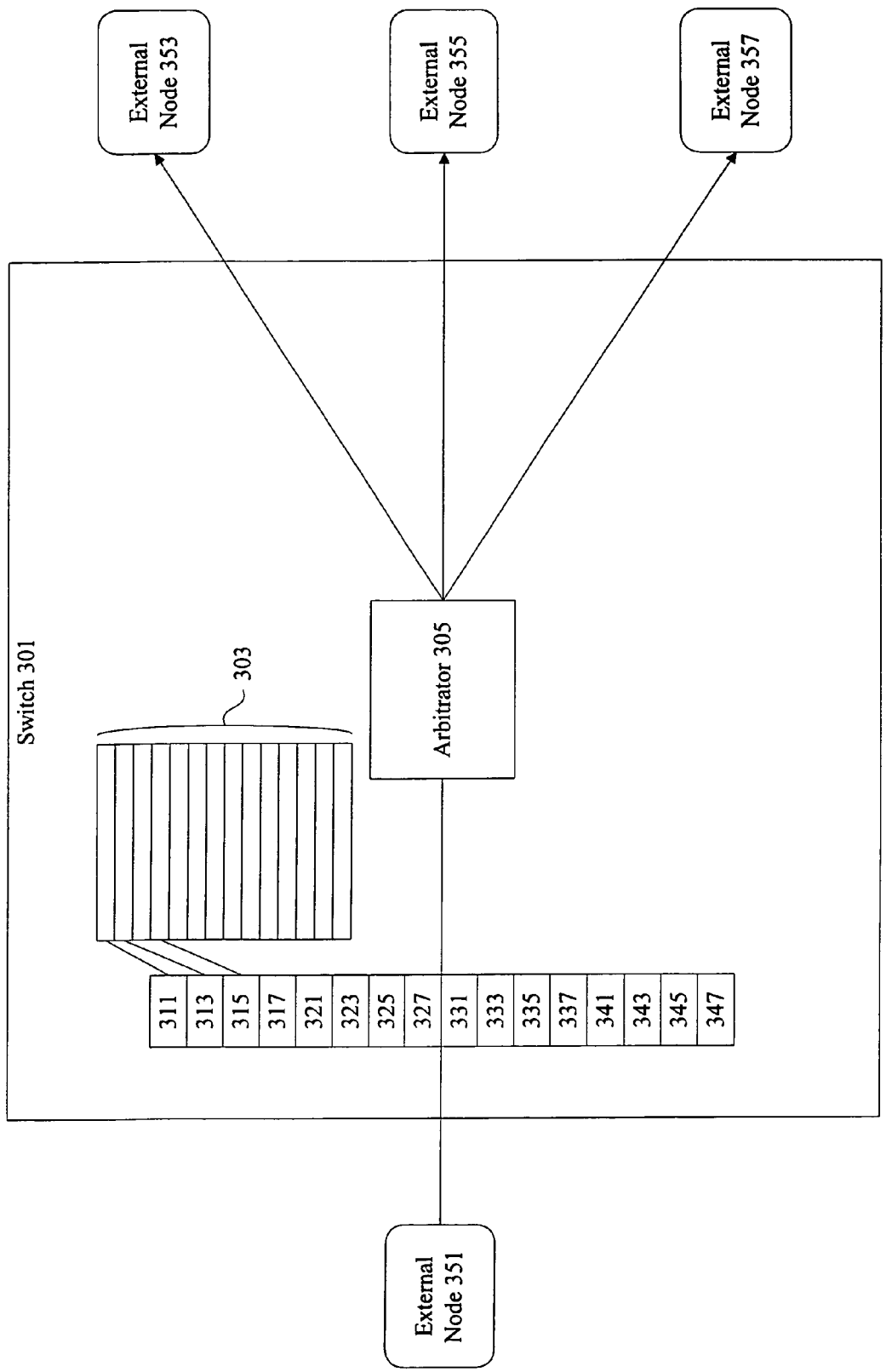
FIG. 3A is a diagrammatic representation of a switch that can implement one example of congestion detection.

FIG. 3A is a diagrammatic representation of a switch that can implement the techniques of the present invention as well as buffer-to-buffer credit mechanisms. A switch 301 is connected to external nodes 351, 353, 355 and 357, at least one of which is an "edge device" outside a Fibre Channel fabric. In this example, node 351 is an edge device. The switch 301 includes a buffer 303 of shared memory associated with each switch port. A buffer 303 is associated with external node 351. Buffers associated with external nodes 353, 355, and 357 are not shown for purposes of clarity. The buffer 303 can hold traffic destined for external nodes 353, 355, 357, and loop back traffic to external node 351.

In some implementations, frames destined for the various external nodes are all placed in the same buffer 303. Consequently, when a switch 301 receives a large volume of frames destined for a particular node such as external node 353, frames associated with external node 353 can consume the entire buffer 303. When the buffer 303 is full, additional traffic from external node 351 is blocked because the switch 301 does not allocate additional credits to external node 351. Traffic destined for external node 353 is blocked along with traffic destined for any of the other noncongested external nodes.

According to various embodiments, the frames stored in buffer 303 are referenced by pointers in frame descriptor queues 311-347. Each frame descriptor can contain a pointer or reference identifying where the frame is stored in the buffer 303. Pointers or references to a shared buffer are herein referred to as descriptors. Descriptors can also identify other information such as frame priority.

In one example, an arbitrator 305 selects frames using a round-robin methodology. In a first round, a frame destined for external node 353 is selected. In a second round, a frame destined for external node 355 is selected, etc. More particularly, the arbitrator 305 may first select a high priority frame associated with descriptor 311 destined for external node 353, then select a high priority frame associated with descriptor 321 destined for external node 355, then select a high priority frame associated with descriptor 331 destined for external node 357, etc. It should be noted that a variety of techniques for selecting a frame can be used, as will be appreciated by one of skill in the art.

A queuing system having buffers apportioned based on destination can be referred to as virtual output queuing (VOQ). VOQ is described further in Tamir Y., Frazier G.: "High Performance multi-queue buffers for VLSI communications switches", Proc. Of 15$^{th}$ Ann. Symp. On Comp. Arch., pp. 343-354, June 1988, the entirety of which is incorporated by reference for all purposes. As noted above, when the shared buffer space associated with a particular external node becomes full due to traffic destined for a particular destination, all traffic destined for any destination from that particular external node is blocked. This can prevent traffic from flowing to even previously noncongested destinations and can cause cascading congestion.

An abstraction identifying traffic with particular characteristics between two nodes is herein referred to as a flow. In one example, a flow is referenced by a source identifier, a destination identifier, a priority, a class, and an exchange identifier. Other characteristics are also possible. It should be noted, however, that a flow may also be referenced merely by a source and destination identifier. It is desirable to provide techniques for detecting and specifically alleviating congestion on target flows.

Figure 3B:
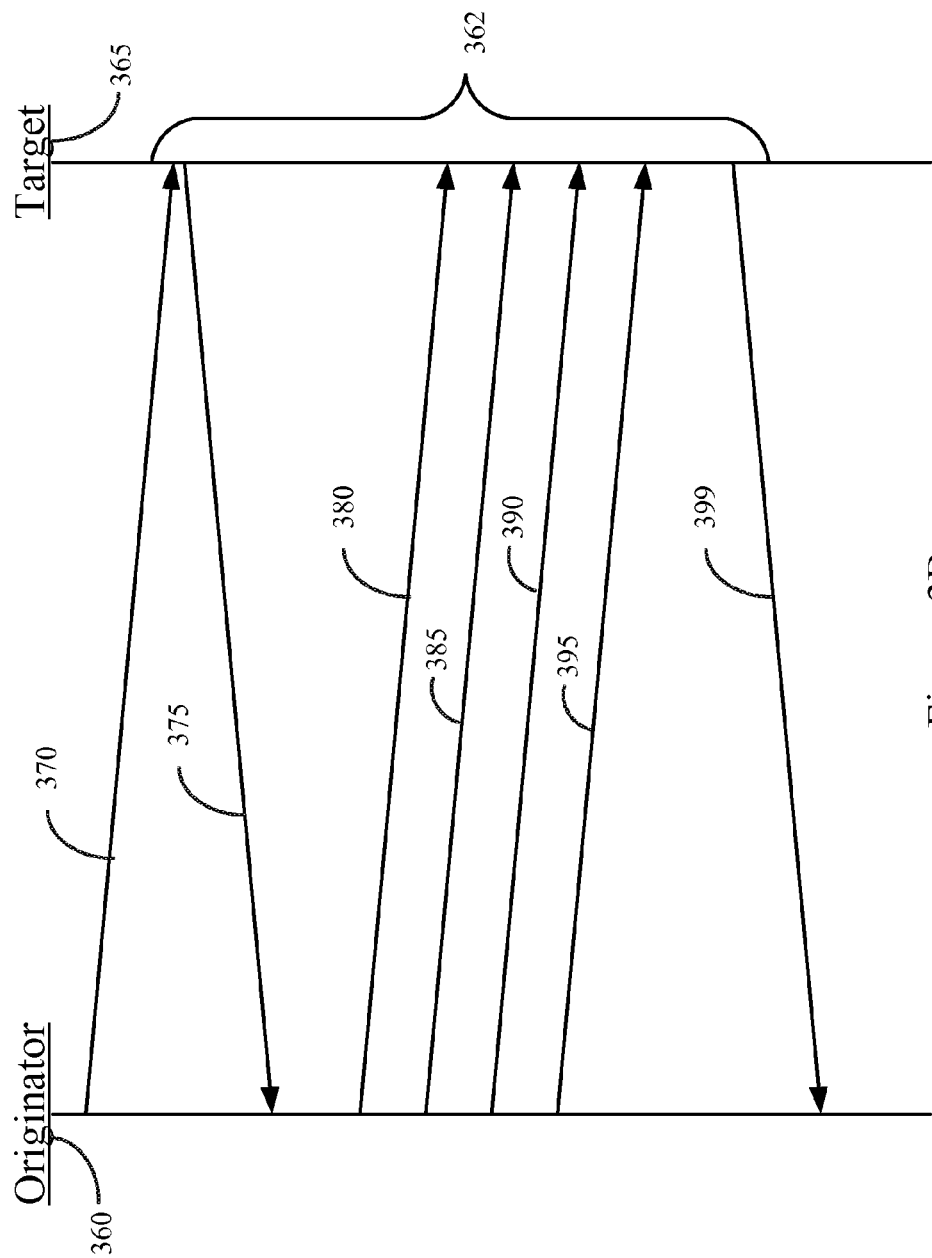
FIG. 3B is a flow diagram depicting one example of an exchange.

One such type of flow is an "exchange," which is an operation that may include multiple frame transmissions between edge devices. Well-known examples of exchanges include SCSI read operations and SCSI write operations. Referring now to FIG. 3B, exchange 362 between originator 360 and target 365 will now be described. In this example, originator 360 is a personal computer and target 365 is a storage device. Both originator 360 and target 365 are edge devices and are sending frames through a Fibre Channel fabric. Accordingly, the same OX_ID will be used in all frames transmitted by both originator 360 and target 365 during exchange 362.

First, originator 360 sends frame 370 to target 365, indicating that originator 360 wants to write data to target 365. In this example, target 365 responds with frame 375, indicating that originator 360 may write data to target 365. Originator 360 then sends a series of frames 380, 385, 390 and 395 to target 365 in the process of writing data to storage device 365. Although only 4 frames are indicated, it will be appreciated by those of skill in the art that more or fewer frames may be required by the write operation. Finally, storage device 365 sends status frame 399 to originator 360, indicating whether the write operation was a success or a failure.

Figure 7:
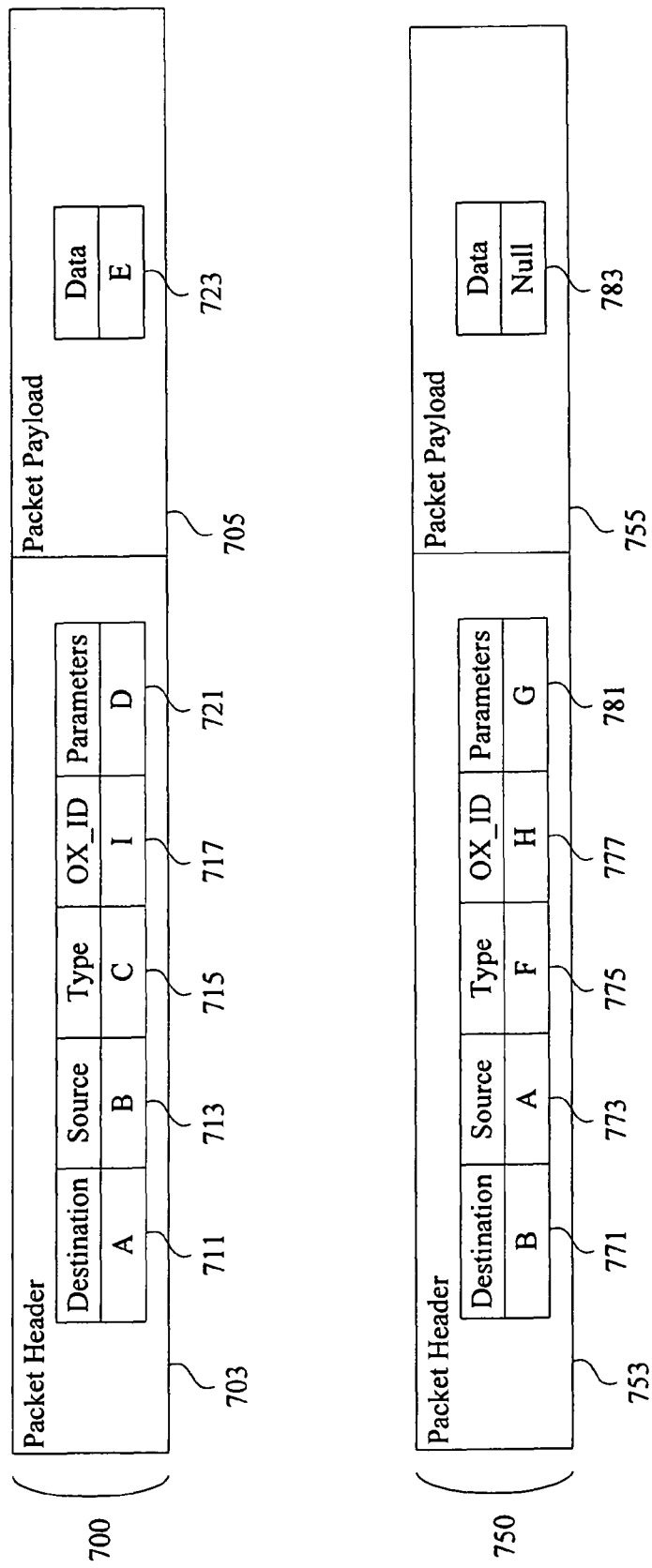
FIG. 7 is a diagrammatic representation of a format that may be used for quench messages.

According to the Fibre Channel protocol, such exchanges are identified by a field in the header of a Fibre Channel frame known as an originator exchange identifier or "OX_ID." An example of an OX_ID field is shown in FIG. 7 and is discussed below. Some preferred implementations of the invention control network congestion at the exchange level, because it is often a particular operation that causes network congestion.

Referring again to FIG. 1, if network congestion is being caused by a huge write operation from host 111 to disk array 153, that operation should be detected (e.g., by switch 107) and host 111 should be notified by the detecting network device. Preferably, the notification should identify the write operation from host 111 to disk array 153 as the cause of congestion, e.g., by stating the OX_ID of the write operation. Subsequently, the write operation should be subject to a congestion reaction mechanism, preferably implemented at host 111. By isolating the operation(s) that are causing network congestion, better granularity and efficiency may be obtained for controlling traffic on the network.

FIG. 4 is a table that can be used for congestion detection. FIG. 4 shows a table with values indicating when an instruction to alleviate congestion should be generated. Messages and instructions transmitted from a congested network node to another node in the network for alleviating congestion are referred to herein as quench messages.

Column 403 in table 401 shows the buffer level of the switch that may be generating quench messages. The buffer level column 403 is associated with an interval column 405 showing the number of received frames received between quench message generation. Row 411 indicates that when the number of packets in a buffer that can hold 512 packets is between 0 and 10, no quench messages are generated. When the number of packets is between 11 and 15, one quench message is generated every 260 frames. When the number of packets in the queue is between 112 and 127, one quench message is generated after six frames are processed. One formula for determining the interval between quench message generation is as follows:

X=buffer level in packets based on a buffer capacity of 512 packets
N=interval between quench message generation
If $X/16 >= 8$, then $N=4$,
else $N=4+2^{(8-(X/16))}$.

As will be appreciated by one of skill in the art, a variety of different equations can be used. Equations can change based on buffer capacity or network quality of service parameters.

The table shown in FIG. 4 provides a deterministic technique for deciding when to generate quench messages. It should be noted that various other techniques can be used. In one example, each buffer level can be associated with a probability of quench message generation. For example, when the buffer level reaches 80 percent, there may be a 70 percent probability that a quench message is generated upon receipt of a frame. When the buffer level reaches 50 percent of capacity, there may be a 10 percent probability that a quench message is generated upon receipt of a frame. When the buffer level is 10 percent of capacity, there may be a 0.01 percent probability that a quench message is generated upon receipt of a frame.

Deterministic techniques, however, provide several benefits over nondeterministic techniques. In particular, deterministic techniques prevent the generation of bursts of quench messages. Using a random probability function, several quench messages may be generated in close proximity based on the characteristics of the random number generator. The bursts of quench messages may have too large an effect on the reduction of traffic while the lag between bursts may result in unremedied congestion. Deterministic techniques can be less bursty. It should be noted, however, that nondeterministic techniques can use more complex control algorithms to minimize quench message bursts.

Many tables and many different values can be used for determining the intervals and the frequency for transmission of quench messages. Factors for setting table values can include network size, number of output ports, buffer size, and tolerance for delay. Quench messages can be generated more frequently when the nature of traffic is bursty while quench messages can be generated less frequently when traffic is more steady. According to various embodiments, the frequency and intervals for generating quench messages may depend not on the buffer size itself but on the change in buffer size or the derivative of the change in buffer size. If the buffer level is growing rapidly, quench messages may be generated more frequently. In one example, if the buffer level is growing at a sufficiently rapid rate, a series of quench messages may immediately be generated.

Figure 5:
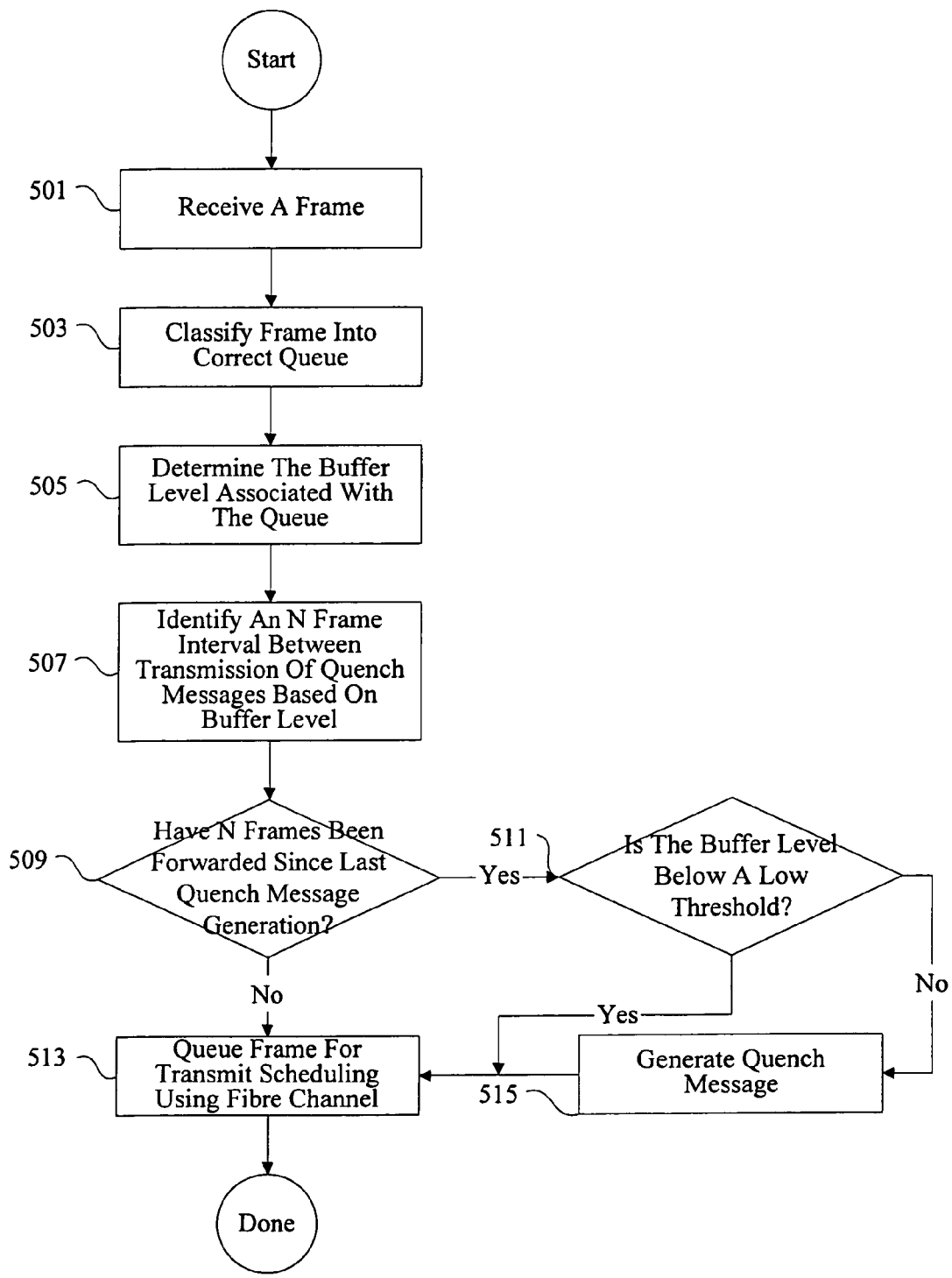
FIG. 5 is a process flow diagram showing a switch detecting congestion.

FIG. 5 is a process flow diagram showing a technique for detecting congestion. At 501, a frame is received from an upstream external node. At 503, the frame is classified into the correct queue in the buffer associated with the particular external node. Classifier logic can use various parameters such as destination ports, priority, and source and destination addresses to place a frame in the correct queue. At 505, the level of the buffer associated with the particular external node is determined.

Using the buffer level determination, a data structure such as the one shown in FIG. 4 can be referenced to find a frame interval between which quench messages are transmitted at 507. In one example, quench messages are transmitted after N frames are received. That is, a switch may forward N frames from the upstream external node to various external nodes before transmitting quench messages to the upstream external node. At 509, it is determined whether N frames or more have been forwarded since the last quench message was generated. If the N frame interval has elapsed, it is determined at 511 if the buffer level is below a low threshold. If the buffer level is below a low threshold, no quench message is generated and the frame is queued for transmit scheduling at 513. Otherwise, a quench message is generated at 515. The quench message is forwarded to the upstream external node. The frame received from the upstream external node is queued for transmit scheduling towards the destination node as indicated by the destination identifier in the frame.

It should be noted that various techniques for determining when a quench message is generated are contemplated. For example, quench messages can be generated at periodic time intervals. That is, quench messages may be generated after a certain period of time has elapsed. The periodic time intervals can be predetermined or dynamically set. The buffer level can also be used to influence the time interval between which quench messages are generated. When the buffer level is high, quench messages can be generated more frequently with a smaller time interval. When the buffer level is low, a larger time interval may elapse before quench messages are generated. In other examples, quench messages may be generated when the number of frames associated with the same flow exceed a particular set portion of the buffer. In one example, when more than 50 percent of the buffer is filled with frames associated with the same source and destination pair, a quench message may be generated and transmitted towards the source node. In still other embodiments, quench messages can be generated randomly upon the receipt of a large number of frames from a source node in a small time interval.

By analyzing the buffer and the characteristics of the frames in the buffer, quench messages can be generated on an as needed basis and directed towards particular flows. Quench messages can also be used to provide quality of service for particular flows. For example, a certain percentage of the buffer can be reserved for receiving frames for priority traffic from a critical external node. If the buffer level approaches the reserved level, quench messages can be generated and transmitted to various flows not associated with priority traffic or quench messages can be generated and transmitted to non-critical external nodes. When priority traffic is received from the critical external node, no quench messages are generated until the buffer level is almost entirely full. The reserved buffer portions can be allocated for multiple flows for multiple external nodes. In one example, it may be a goal to provide 25 percent of the output buffer to each of four external nodes. Quench messages can be generated when the portion of the buffer associated with one particular external node exceeds 35 percent or when the total buffer level exceeds 80 percent. Quench messages can then be generated more frequently when the buffer level exceeds 85 or 90 percent. A variety of mechanisms for providing quality of service can be implemented using the generation of quench messages. Information relating to the analysis and characterization of buffer levels can also be provided in the quench messages.

Figure 6:
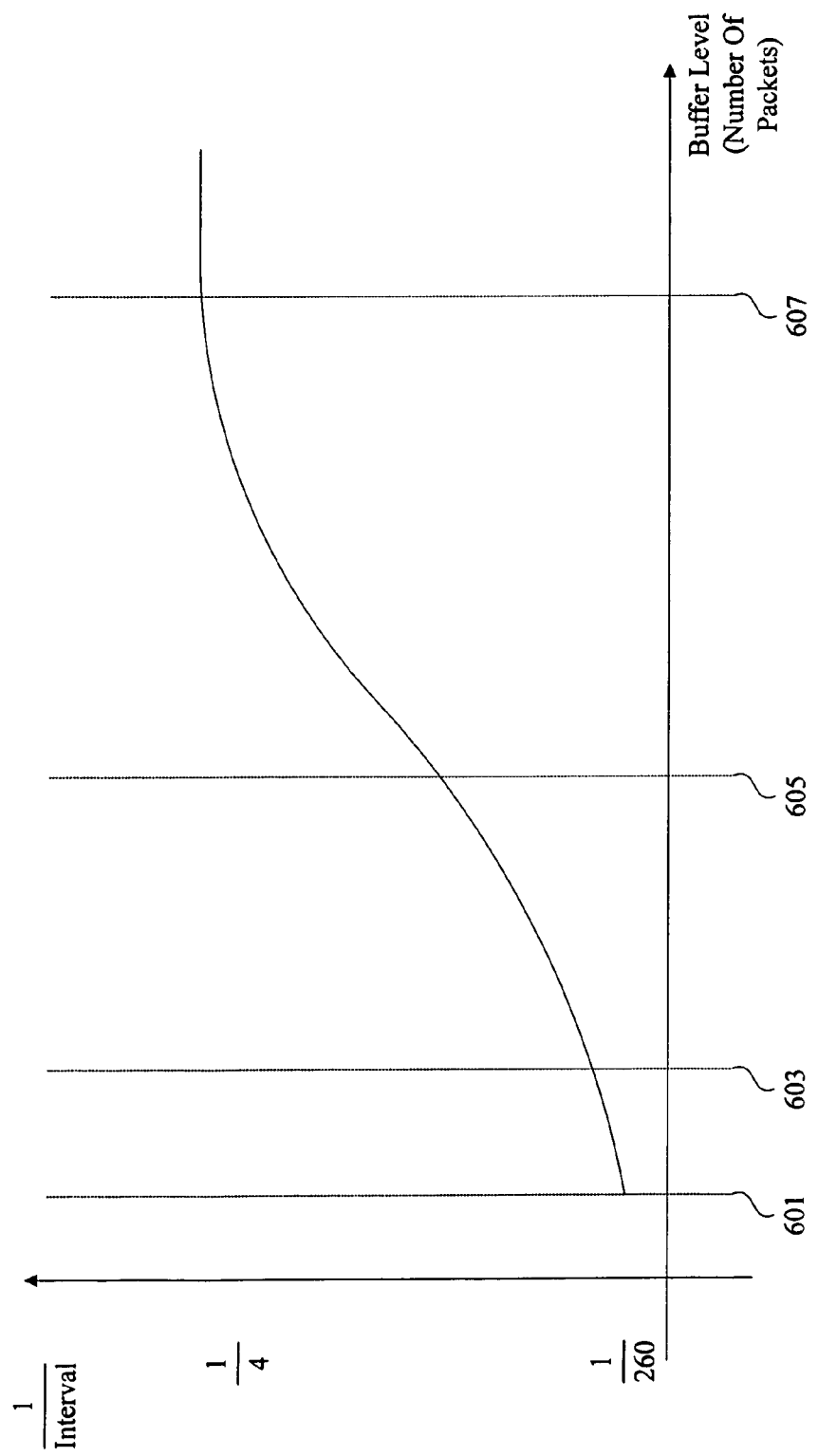
FIG. 6 is a graphical representation of queue levels that can be used for quench message generation.

Even more accurate congestion control can be implemented by using different quench messages or by providing information in each quench message. FIG. 6 is a graphical representation depicting the generation of various quench messages at a congested switch based on buffer or queue levels. When the buffer level exceeds a high threshold 607, a path quench can be generated. A path quench can instruct all switches between the source node and the congested switch to immediately stop sending traffic associated with a particular flow towards the congested switch. A path quench can be used when the buffer level at the congested switch is near capacity and an immediate traffic reduction is necessary to avoid the depletion of credits and the buffer-to-buffer credit mechanism. A high threshold can vary based on buffer size and the importance of avoiding the depletion of credits. In one example, the high threshold is set at 90 percent of the buffer size.

If the buffer level is between a high threshold 607 and a low threshold 603, an edge quench message can be generated by the congested switch. In some implementations, the edge quench instructs the congestion control device closest to the source node to reduce the traffic flow towards the congested switch. In other implementations, the edge quench instructs the source node to reduce the traffic flow towards the congested switch. In some such implementations, edge quench messages instruct a source node to reduce a traffic flow associated with a particular operation, e.g., identified by a particular OX_ID. The edge quench messages can provide a gradual reduction in traffic flow from a particular source node. A cut off threshold 601 can also be provided to prevent the generation of quench messages. By not sending a quench message, congestion control and slow down of other traffic can be avoided when the quench message is not necessary. Nodes that can recognize instructions to reduce traffic flow are herein referred to as "congestion control devices."

Quench messages can also contain information about the buffer level. In one example, path quench and edge quench messages contain an indicator providing information on whether the buffer level exceeds a target or equilibrium level. The target or equilibrium level 605 can be an optimal buffer level for providing maximum throughput at a particular congestion control device. If the buffer level is above or below the target level 605, the information can be transmitted to a congestion control device to allow the congestion control device to better determine transmission rates at various times. In one example, if the buffer level is above the target level 605, a congestion control device may elect to decrease its transmission rate associated with the flow and more gradually increase the transmission rate after the adjustment. Alternatively, if the buffer is below the target level 605, a congestion control device may elect to decrease its transmission rate associated with the flow and more aggressively increase the transmission rate after the adjustment.

Present and past buffer level information can be provided to the congestion control device. In one embodiment, changes in the buffer level can also be provided to the congestion control device. If the buffer level is increasing, the congestion control device may elect to decrease its transmission rate associated with the flow, maintain the lower transmission rate, and subsequently gradually increase its transmission rate after a period of time has elapsed.

Although FIG. 6 shows a high and low threshold for determining whether to send a path quench or edge quench message, it should be noted that various numbers of thresholds can be used. In one example, a path quench instructs all congestion control devices between the congested switch and the source node to drop transmission rates associated with a particular flow to 0. Edge quench instructs the congestion control device nearest the source node (or the source node itself) to drop transmission rates associated with a particular flow to one-half the previous allowed rate. In another example, three types of quench messages are used based on a comparison of buffer levels against three different thresholds.

A path quench may instruct all congestion control devices between the congested switch and the source node to drop transmission rates associated with a particular flow to 0. It should be noted, however, that the recovery rate in this case can be rapid. An edge quench may instruct the congestion control device closest to the source node (or the source node itself) to drop transmission rates to, e.g., one half the allowed rate. In some embodiments, edge quench and path quench messages may not contain buffer characterization information. In other embodiments, a single quench message can be used where the quench message contains ample information on the present, past, and change in buffer levels.

FIG. 7 is a diagrammatic representation of a format that may be used for a quench message that can be generated at a congested switch. A congested switch identifies a frame 700. The frame 700 may be randomly selected or may be a frame selected after an N frame interval. The frame 700 includes a packet header 703 and a packet payload 705. A packet header 703 includes a destination identifier 711 with an address A and a source identifier 713 with an address B. The packet header can also include a type 715, parameter information 721, as well as an OX_ID 717. Each switch along a transmission path can use the source identifier 713, destination identifier 711, and the OX_ID 717 to determine a next hop. A packet payload 705 can include data 723 for extraction by the destination node.

The congested switch, which may be a congestion control device itself, takes the destination identifier with address A and source identifier with address B and swaps the two values so that quench message 750 includes destination identifier 771 set to address B and source identifier 773 set to address A. The quench message packet header 753 includes a type 775 that indicates that the frame is a quench message such as a path quench or an edge quench. The value used to indicate that the frame 750 is a path or edge quench message can be a vendor specific value set for the type field 775. According to various embodiments, the quench message packet can also include parameter information 781 including buffer characterization information. With reference to packet payload 755, the quench message does not need to contain any data 783.

In case the quench message is a path quench message, OX_ID 777 can be different from OX_ID 717. For example, it can be a random number. By having a different OX_ID 777, path selection using a source identifier 773, a destination identifier 771, and an OX_ID 777 will generate different paths.

In case the quench message is an edge quench message, OX_ID 777 can be the same as OX_ID 717 to identify a specific operation that is causing congestion. The quench message is preferably sent to the edge device indicated by source identifier 773. The edge device, in turn, will implement an appropriate congestion mitigation method. Preferably, the congestion mitigation method will be applied to an operation identified in the edge quench message. The method may be proprietary or it may be known in the art, e.g., a leaky bucket method, a token bucket method, linear inter-packet delay, etc. The support for the congestion mitigation capability may be indicated by the edge device during the Fabric Login (FLOGI) exchange with a bit in the Common Service Parameters of the FLOGI frame payload. If this capability is absent, the switch to which the edge device is connected will terminate the edge quench message and implement the appropriate congestion mitigation method on behalf of the edge device.

Figure 8:
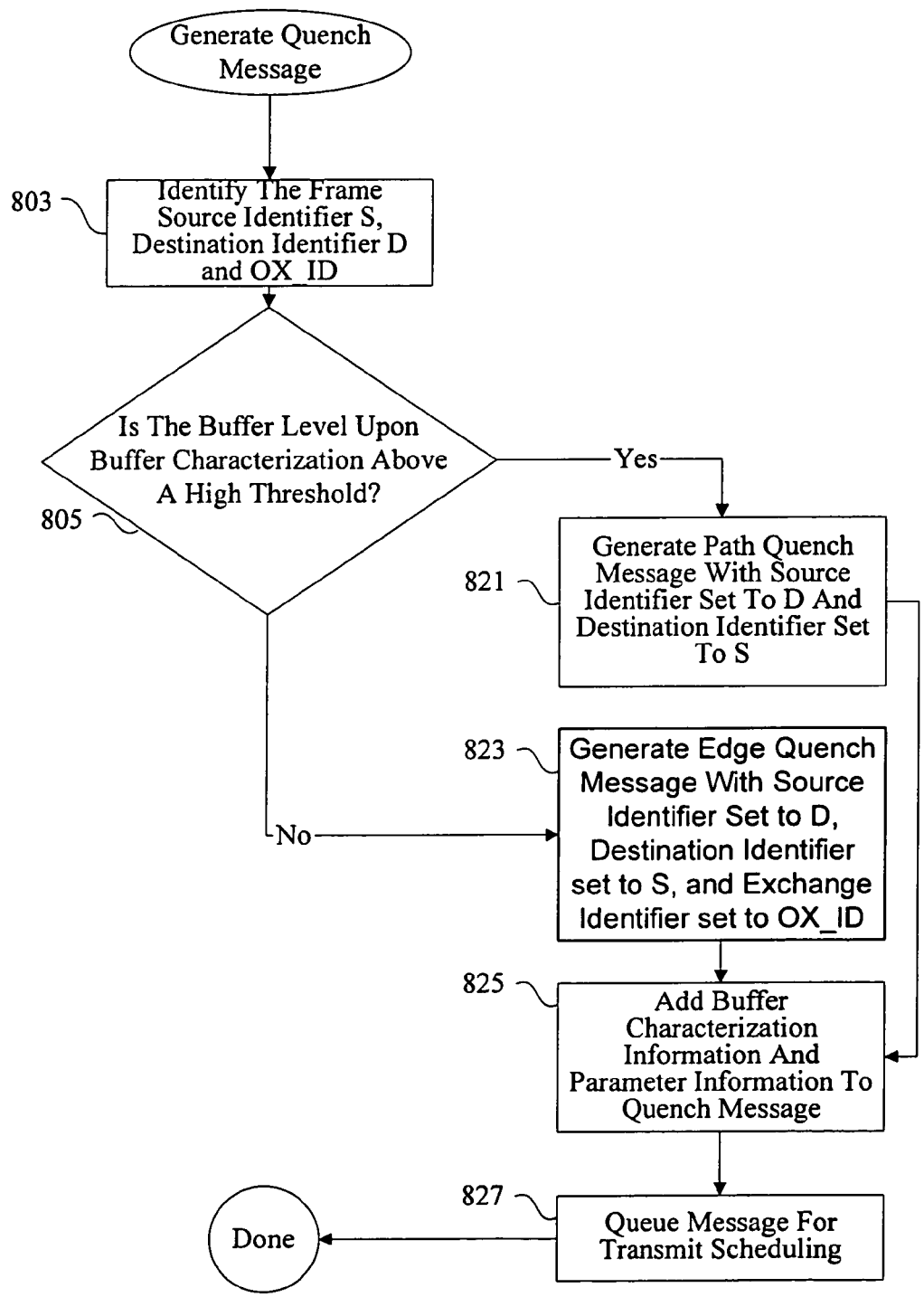
FIG. 8 is a process flow diagram showing the generation and transmission of an edge quench or path quench message.

FIG. 8 is a flow process diagram depicting the generation of a quench message. According to various embodiments, the flow associated with the Nth frame received since the last quench message was generated is selected for quenching, although other techniques may be used as noted above. At 803, the frame source identifier S, the frame destination identifier D and the OX_ID are extracted. At 805, the buffer can be characterized to not only determine what type of quench message to generate, but also to provide information to congestion control devices between the congested switch and a source node.

According to some implementations, if it is determined in step 805 that the buffer level is above a high threshold, a path quench message with the source identifier set to D and a destination identifier set to S is generated at 821. Buffer characterization information along with other parameter information can be added to the quench message at 825. The path quench message can then be queued for transmit scheduling using Fibre Channel at 827. Otherwise, an edge quench message with source identifier set to D, a destination identifier set to S, and an Exchange Identifier OX_ID is generated at 823. Buffer characterization and parameter information similarly can also be added to the edge quench message at 825 and the quench message can be queued for eventual forwarding using Fibre Channel at 827.

According to other implementations, the congestion detection step 805 will be performed exclusively on an exchange basis. If a particular operation is causing congestion at that buffer, an edge quench message will be sent to the edge device causing the congestion. Preferably, the edge quench message will identify the particular exchange that is causing the congestion, e.g., by the OX_ID value.

Figure 9:
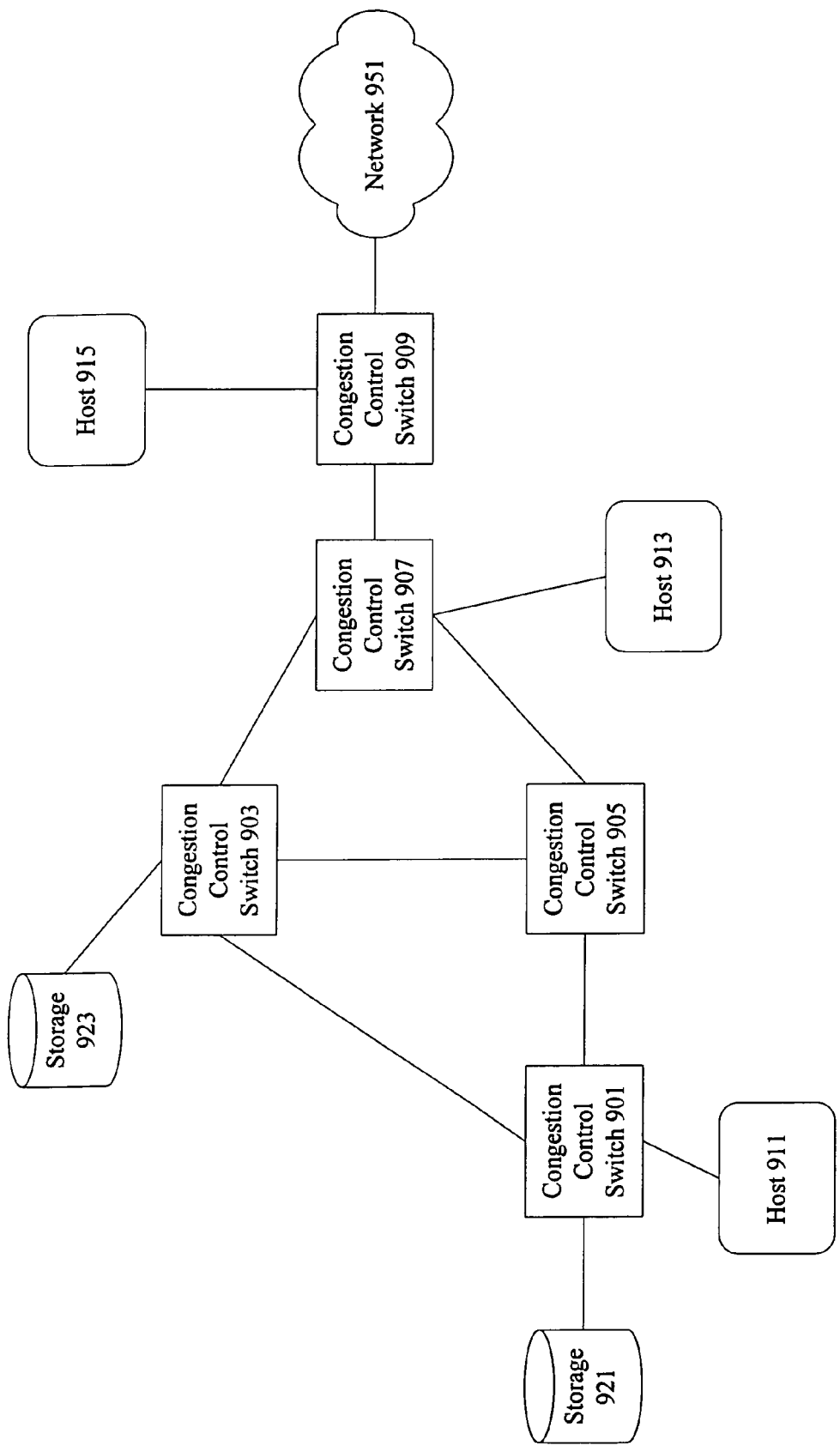
FIG. 9 is a diagrammatic representation of a network that can implement congestion control.

FIG. 9 is a diagrammatic representation of a network containing network nodes that can receive quench messages such as path quench or edge quench frames. As noted above, a congestion control device 909 may generate a quench message by swapping the source and destination identifiers of a received frame, and including the OX_ID of such frame if the quench message is an edge quench message. In one example, the source of the received frame may be host 911 while the destination of the received frame may be a node of the network 951. The frame may have traveled to switch 909 through switches 901, 903, and 907. The congestion control device 909 may generate a quench message, as noted above. The quench message would have a destination set to host 911 and a source set to a node of the network 951. The frame may have traveled to switch 909 through switches 901, 903 and 907. The congestion control switch 909 may generate a quench message as noted above. The quench message would have a destination set to host 911 and a source set to a node of network 951. If a path quench message is generated, every congestion control switch along which the path quench message is forwarded can implement a congestion control mechanism. In this example, congestion control switches 907, 903, and 901 each implement control.

It should be noted that the path quench message may be forwarded to switch 905 instead of the switch 903. If the path quench is forwarded to switch 905 instead of to 903 before reaching congestion control device 901, a congestion control device 905 may ignore the quench message because it can be configured to recognize that a frame with a source set to host 911 and a destination set to network 951 was not transmitted through congestion control device 905. Nonetheless, congestion control can still be implemented.

If an edge quench message is generated, it is forwarded to a congestion control device 907 and subsequently to either congestion control device 903 or congestion control device 905, all of which ignore the edge quench message. Congestion control switch 901 can recognize that it is directly coupled to host 911 and consequently would decide whether to forward the edge quench message to host 911, if host 911 implements congestion control mechanisms, or, otherwise, terminate the quench message and activate its own congestion control mechanism.

Figure 10:
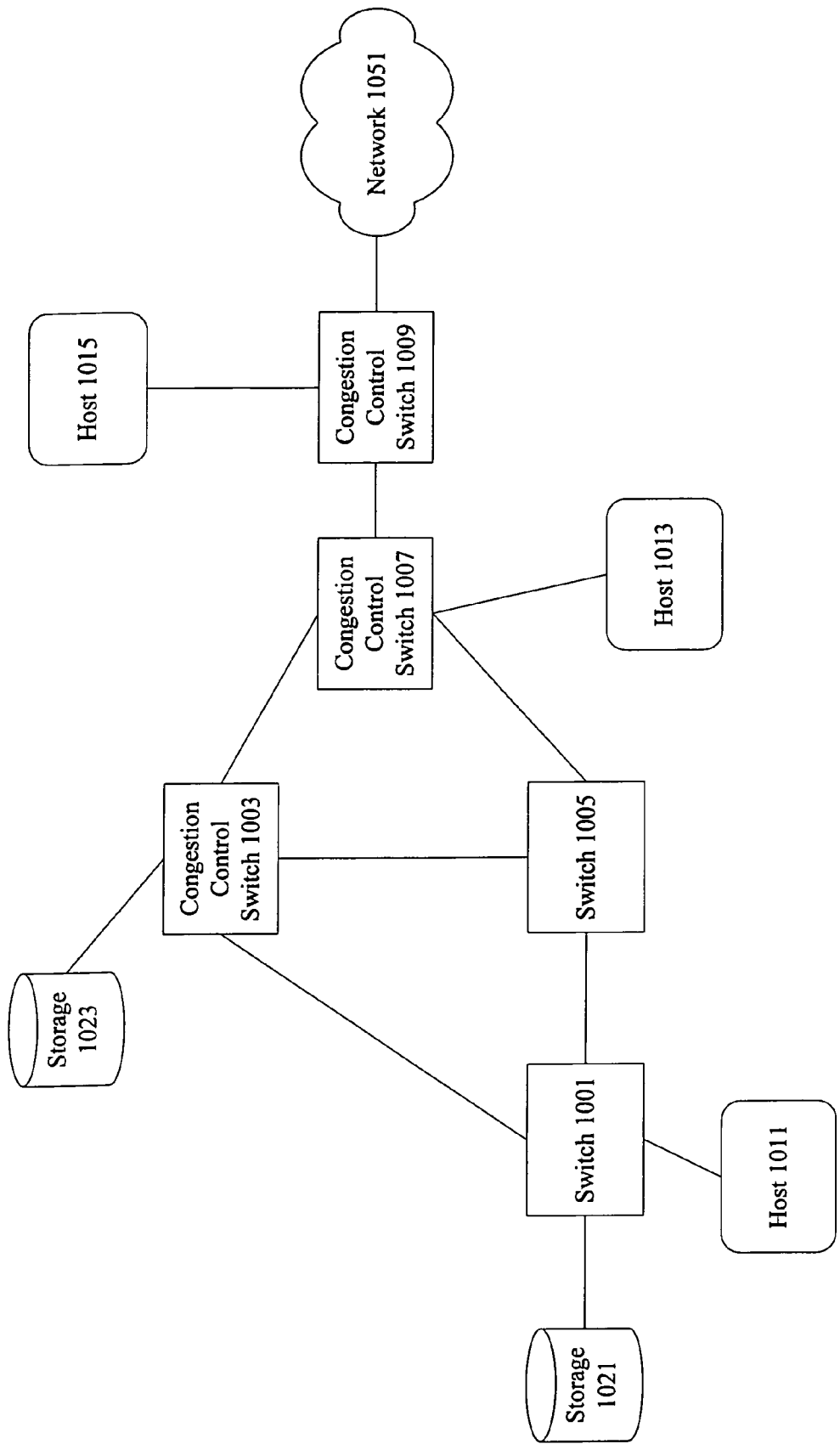
FIG. 10 is a diagrammatic representation of a mixed network that can implement congestion control.

FIG. 10 is a diagrammatic representation of a network containing network nodes that can receive quench messages such as edge quench frames where a congestion control device is not directly coupled to the host that transmitted the frame generating the quench message. In this example, host 1011 transmitted a frame towards network 1051 resulting in the generation of an edge quench message at congestion control device 1009. Congestion control switch 1009 transmits the edge quench message towards the host 1011 through congestion control device 1007. At every congestion control device, a determination can be made as to whether the congestion control device is the one nearest the host 1011.

A variety of mechanisms can be used to allow a congestion control device to determine whether it is nearest the host 1011. In one example, if the congestion control device is in the same domain as the host 1011, congestion control can be immediately implemented at the particular switch. Domain information can be provided in the quench message and matched to any domain information in the congestion control device. In another example, a congestion control device may maintain a list of neighboring switches and their associated domains. And still other embodiments, topology information can be stored with specific data as to which neighboring nodes are congestion control devices. An entire topology map such as a topology map of a storage area network can be maintained to allow a congestion control device to determine whether or not to implement edge quench control mechanisms.

The topology information can be maintained in a variety of formats including graphs, tables, and individual link control information frames from other network nodes. Methods and apparatus for generating a topology map are described in Computer Networks, by Andrew S. Tannenbaum (ISBN: 0133499456), the entirety of which is incorporated by reference for all purposes. In Fibre Channel networks, a protocol called Fabric Configuration Server (FCS) allows the discovery of the physical topology.

Figure 11:
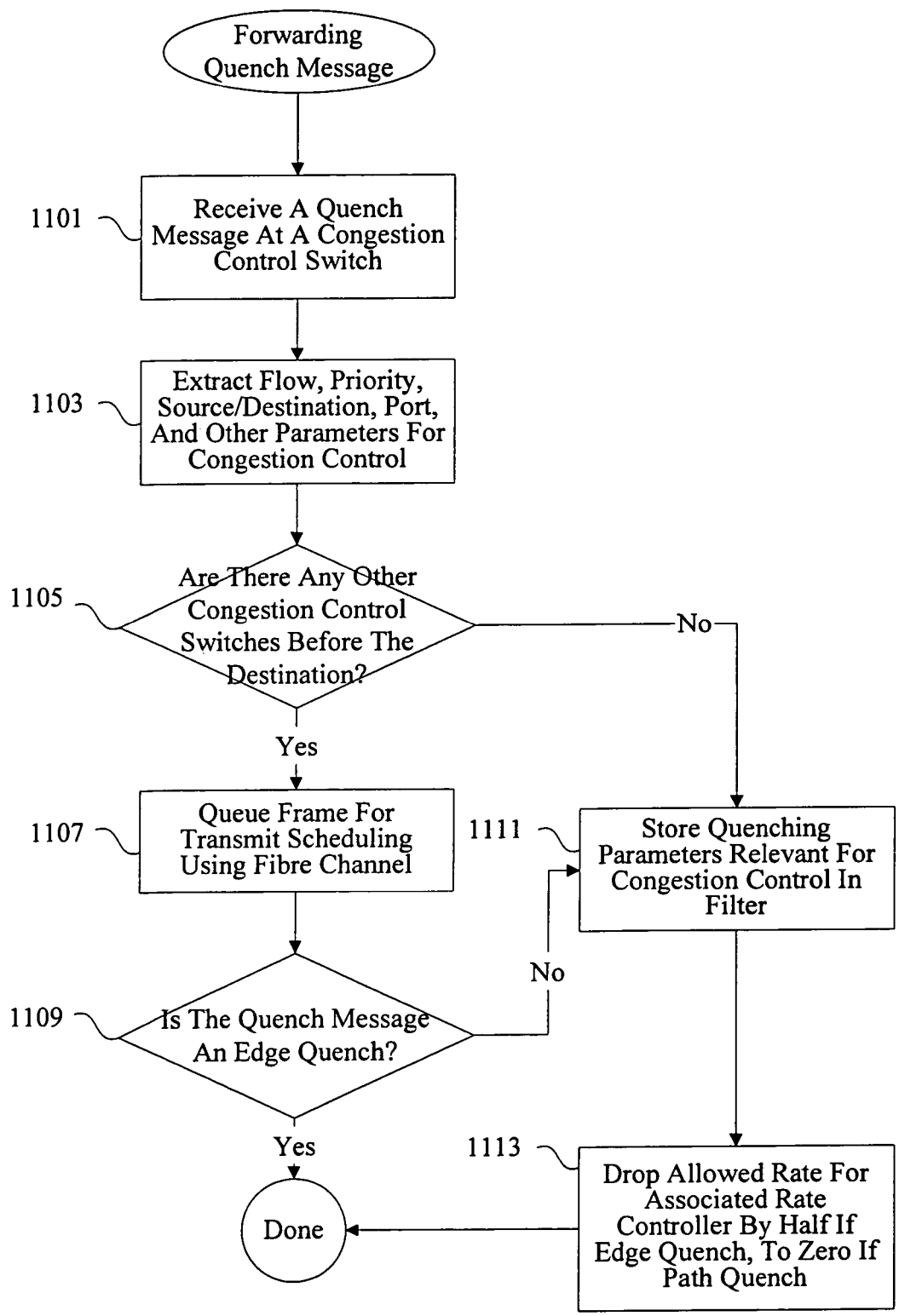
FIG. 11 is a process flow diagram showing techniques for forwarding quench messages.

FIG. 11 is a process flow diagram showing a technique for forwarding a quench message to be implemented within a network fabric. At 1101, a quench message is received at a congestion control device. At 1103, flow parameters such as priority, source identifier, destination identifier, OX_ID, port, and buffer level information can be extracted for congestion control. At 1105, it is determined that if there are any other congestion control devices before the destination as indicated by the quench message. As noted above, congestion control devices can be switches that recognize quench messages such as path quench and edge quench messages. At 1107, since there are other congestion control devices before the destination, the quench message is queued for transmit scheduling using Fibre Channel regardless of whether it is a path quench or edge quench message. At 1109, it is determined if the quench message is an edge quench. If the quench message is an edge quench, no other action needs to be taken. Otherwise, the message is a path quench and parameters relevant for congestion control are stored at 1111.

In one example, quench parameters can be stored in a filter or a controller associated with the congestion control device at 1111. At 1113, the current allowed rate for transmission of the flow associated with the particular parameter information is reduced by half if the instruction is an edge quench message. According to various embodiments, each flow can have a maximum allowed rate. Otherwise, the current allowed rate for the flow associated with the parameter information is dropped to 0. The maximum transmission rate for a particular flow is referred to herein as a maximum allowed rate. The transmission rate adjusted by quench instructions is referred to herein as a current allowed rate. In one embodiment, the transmission rate is initially a maximum allowed rate and gets reduced to a current allowed rate upon receiving quench instructions. The current allowed rate can then increase at a recovery rate until it either receives another quench instruction or reaches the maximum allowed rate. It should be noted that in this example two types of quench messages are used. According to various embodiments, edge quench messages drop the allowed rate by half at the congestion control device nearest the destination. Path quench messages drop the allowed rate at all congestion control devices along the path towards the destination to zero.

Figure 12:
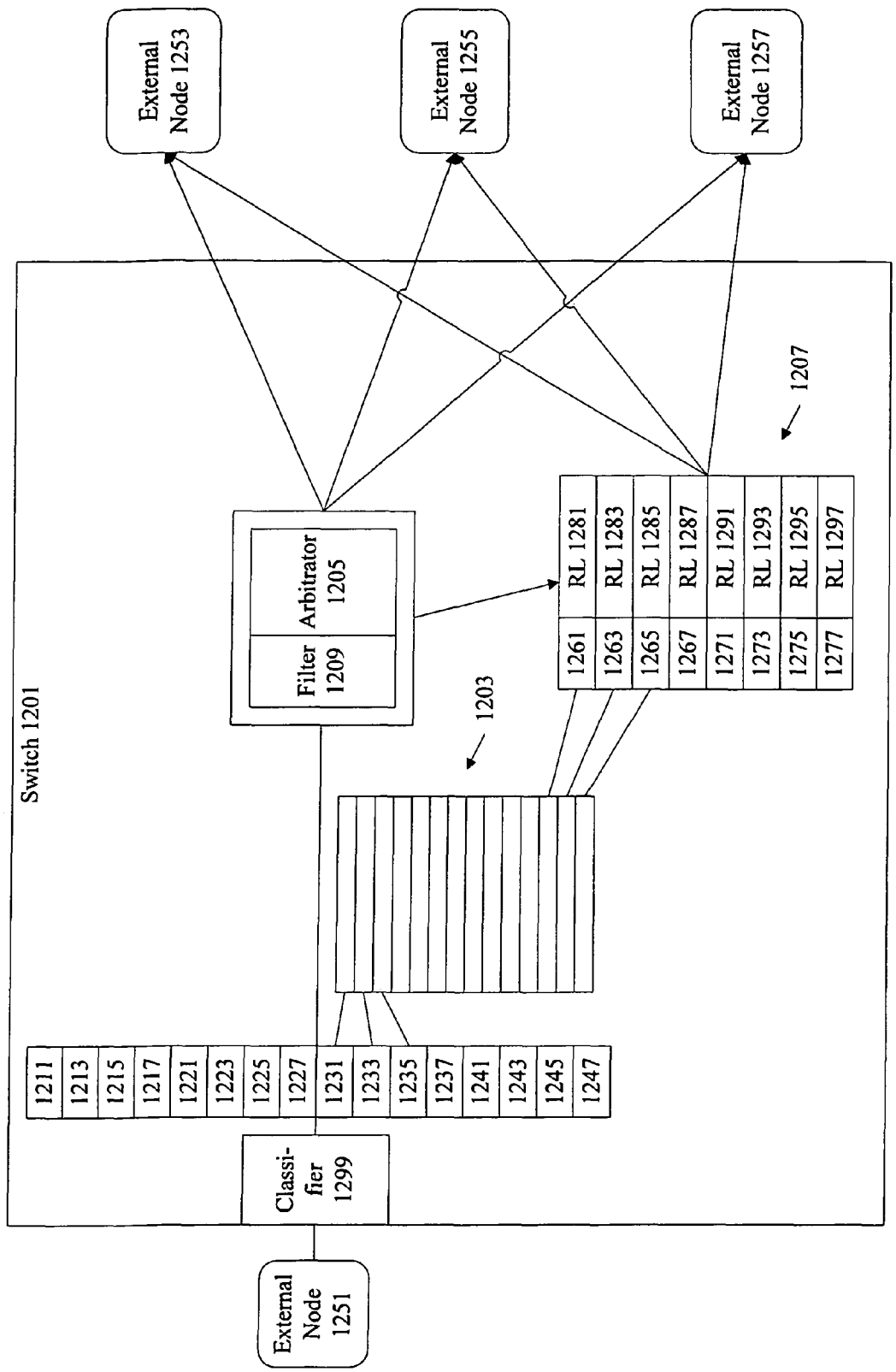
FIG. 12 is a diagrammatic representation of a switch that can implement congestion control upon receiving quench messages.

FIG. 12 is a diagrammatic representation of one example of a congestion control device for implementing congestion control within a network fabric.

Congestion control switch 1201 is coupled to external nodes 1251, 1253, 1255, and 1257. However, only the buffer for receiving frames from external node 1251 is shown for clarity. When a frame is received at switch 1201 from external node 1251, classifier logic 1299 places the frame into the shared buffer pool 1203 and references it with a descriptor or pointer 1211-1247. Descriptors can be associated with information indicating frame priority.

According to various embodiments, filter queues 1261-1277 are provided for frames corresponding to a received quench message. A filter 1209 can maintain quench parameters extracted from quench messages such as path quench or edge quench messages. An arbitrator 1205 typically selects frames for transmission using a round-robin methodology, although other methodologies such as FIFO and random can be used as well. When a frame is selected by the arbitrator 1205 for transmission from buffer 1203 to an external node, a filter 1209 compares the parameters of the selected frame with the quench parameters associated with received quench messages. In one embodiment, a filter performs thirty-two simultaneous comparisons between thirty-two sets of quench parameters and the parameters of a selected frame. Frame descriptors matching one of the thirty-two sets of quench parameters are placed in one of thirty-two different queues in filter queue 1207.

Frame descriptors may be selected for placement in the filter queue if the source and destination address pairs, output port, priority, and/or other parameters correspond. It should be noted that a descriptor can be moved from one of input queues 1211-1247 to filter queues 1261-1277 without changing the shared buffer pool 1203. If the parameters of the frame do not correspond to parameters maintained in filter 1209, the frame descriptor may be forwarded to external nodes such as external nodes 1253, 1255, 1257, and 1251. Otherwise, the frame can be placed into a filter queue associated with the rate limiter. In one example, a filter frame is placed into filter queue 1261 associated with rate limiter 1281. A rate limiter 1281 determines when a frame associated with a descriptor in filter queue 1261 can be transmitted based on a current allowed rate.

Figure 13:
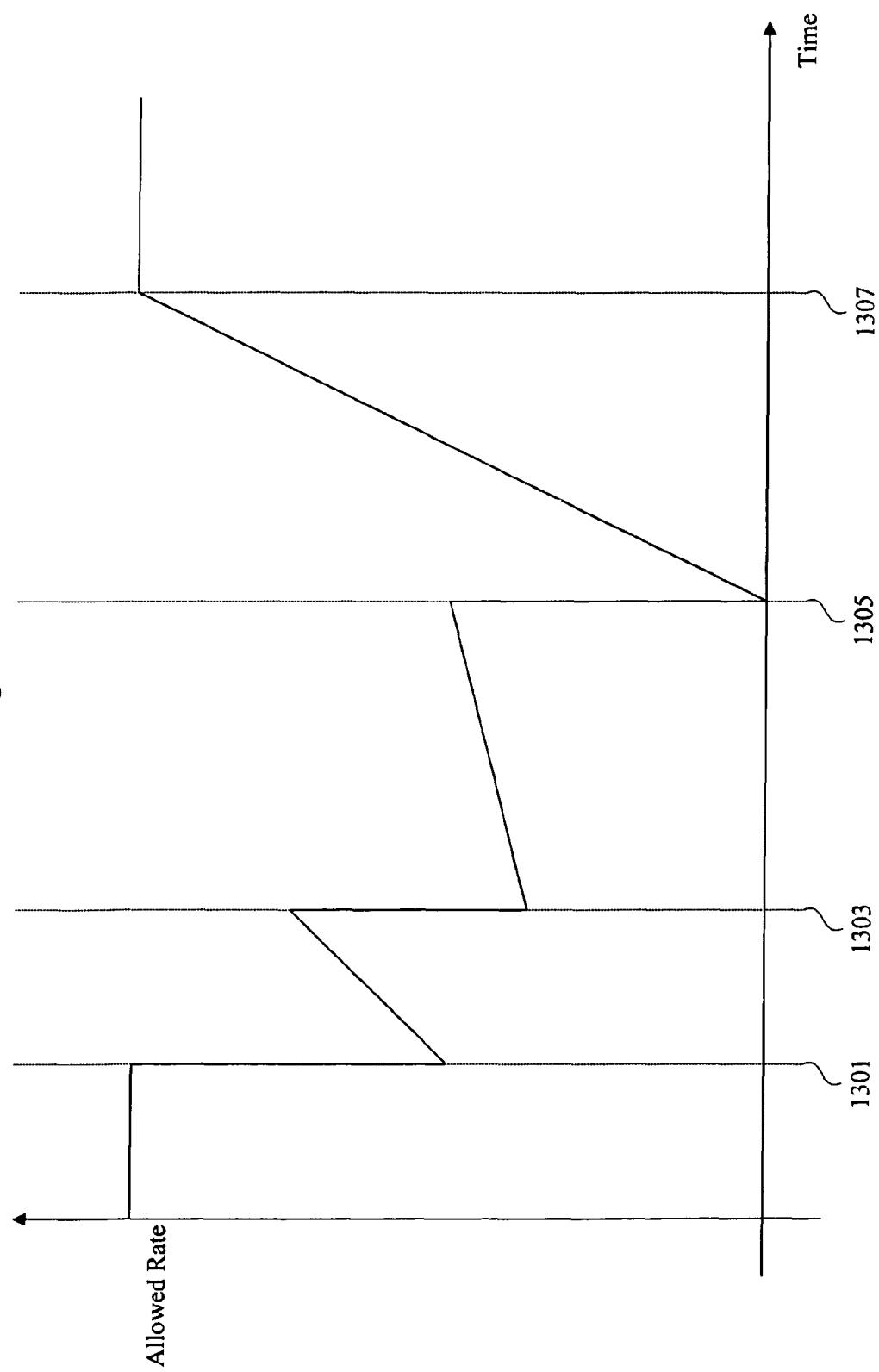
FIG. 13 is a graphical representation of an allowed rate varying based on received edge quench and path quench messages.

FIG. 13 is a graphical representation showing possible variations in allowed rate associated with one or more rate limiters based upon the receipt of quench messages by a congestion control device within a network fabric. As noted above, in some embodiments a path quench message reduces the allowed rate to zero while an edge quench message reduces the allowed rate by half. According to the graphical representation, an edge quench received at 1301 reduces the allowed rate by half. Between 1301 and 1303, the allowed rate gradually increases at a recovery rate that may be determined by the switch controller. The recovery rate may be a predetermined rate or it may be a rate dynamically set based on information such as buffer level characterization information provided in quench messages.

In one example, the recovery rate may be increased when the buffer level characterization information indicates that the buffer level of a congested switch is low relative to an equilibrium point. Alternatively, the recovery rate may be decreased when the buffer level characterization information indicates that the buffer level of the congested switch is high relative to an equilibrium point. At 1303, another edge quench message associated with the rate limiter is received. The allowed rate is again reduced by half at 1303. Between 1303 and 1305, a decreased recovery rate is applied because of factors such as buffer level characterization information. At 1305, a path quench message is received and the allowed rate is reduced to zero. An increased rate is applied between 1305 and 1307. The allowed rate reaches maximum allowed or line rate at 1307 and the filter queue can be released at this point.

Figure 14:
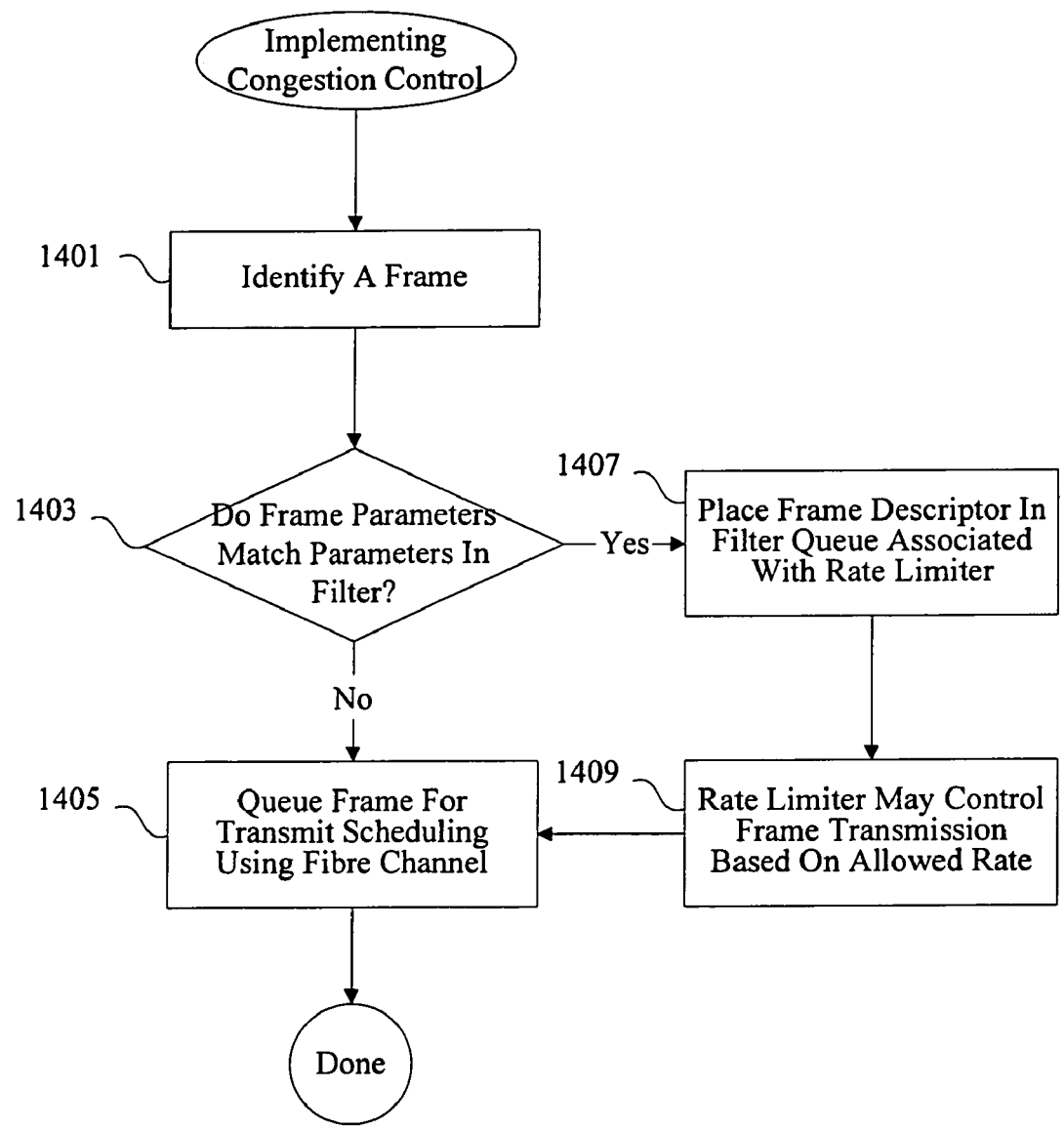
FIG. 14 is a process flow diagram showing the implementation of congestion control.

FIG. 14 is a process flow diagram showing the implementation of congestion control at a switch receiving a quench message. At 1401, a frame is identified. At 1403, frame parameters are compared with parameters in a filter. The parameters compared may include source and destination addresses, priority, and output port. If the parameters match at 1403, the frame descriptor is placed into a filter queue associated with a rate limiter at 1407. The filter queue can delay the transmission of the frame. The rate limiter can be implemented using a variety of mechanisms including token buckets, leaky buckets, and virtual time rate limiters. The rate used by the rate limiter can be set based on the types of quench messages received and the buffer level characterization information in the quench messages. At 1409, the rate limiter may control transmission of the frame based on an allowed rate. Controlling transmission may include delaying the transmission of the frame. At 1405, the frame is queued for forwarding using Fibre Channel. If the parameters of the identified frame do not match parameters in filter at 1403, the frame can be queued for forwarding immediately using Fibre Channel at 1405.

Figure 15:
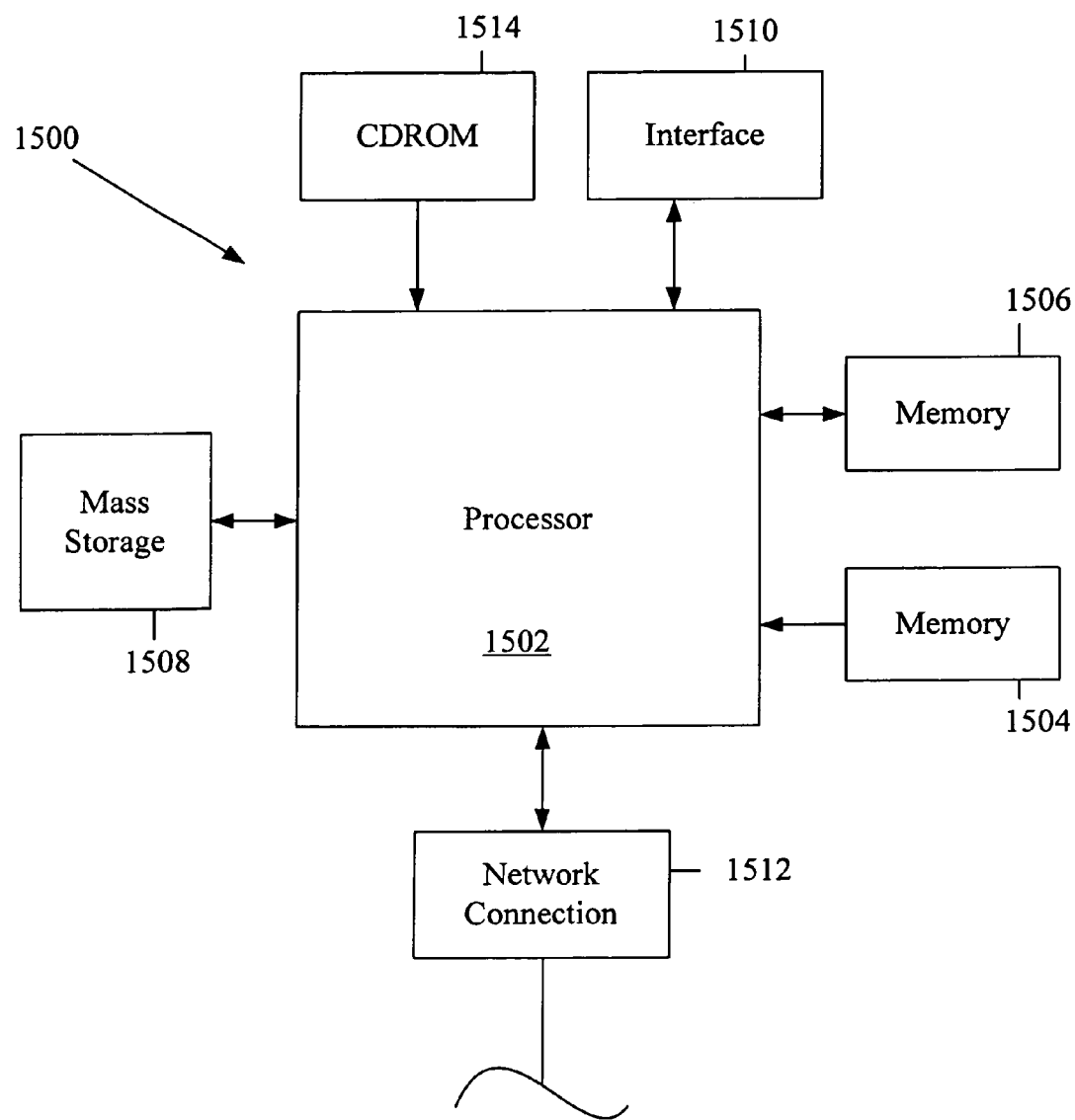
FIG. 15 is a block diagram representing an edge device that can implement congestion control upon receiving quench messages.

FIG. 15 illustrates a computer system that can be used as an edge device for implementing some embodiments of the invention. The computer system 1500 includes any number of processors 1502 (also referred to as central processing units, or CPUs) that are coupled to devices including memory 1506 (typically a random access memory, or "RAM"), memory 1504 (typically a read only memory, or "ROM"). As is well known in the art, memory 1504 acts to transfer data and instructions uni-directionally to the CPU and memory 1506 is used typically to transfer data and instructions in a bi-directional manner.

Both of these memory devices may include any suitable type of the computer-readable media described above. A mass storage device 1508 is also coupled bi-directionally to CPU 1502 and provides additional data storage capacity and may include any of the computer-readable media described above. The mass storage device 1508 may be used to store programs, data and the like and is typically a secondary storage medium such as a hard disk that is slower than a RAM or ROM. The mass storage device 1508 can be used to hold a library or database of prepackaged logic or intellectual property functions, as well as information on generating particular configurations. It will be appreciated that the information retained within the mass storage device 1508, may, in appropriate cases, be incorporated in standard fashion as part of memory 1506 as virtual memory. A specific mass storage device such as a CD-ROM 1514 may also pass data uni-directionally to the CPU.

CPU 1502 is also coupled to an interface 1510 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1502 is coupled to a computer or telecommunications network (e.g., a Fibre Channel network) using a network connection as shown generally at 1512. Network connection 1512 may include, for example, a host bus adaptor (HBA) card, with one side of the HBA connected to the network and the other side connected to a source bus of computer system 1500. With such a network connection, it is contemplated that the CPU can receive information from the network, or output information to the network in the course of performing the above-described method steps. According to some implementations of the invention, an HBA card of network connection 1512 implements a congestion control mechanism in computer system 1500 according to congestion notification from the network (e.g., according to a quench message as described above.) In some such implementations, the congestion reaction will be applied on a per-exchange basis according to the OX_ID of a particular operation.

The hardware elements described above may be configured (usually temporarily) to act as multiple software modules for performing the operations of this invention. For example, instructions for running a compiler may be stored on mass storage device 1508 or 1514 and executed on CPU 1508 in conjunction with primary memory 1506.

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. Instructions such as quench messages can be sent at a variety of different times. It is therefore intended that the invention be interpreted to include all variations and equivalents that fall within the true spirit and scope of the present invention.

We claim:

1. A method for controlling network congestion, the method comprising:
   receiving, at an edge device that is in communication with a Fibre Channel network fabric but is not part of the fabric, a frame having the following:
   a source identifier corresponding to a destination node;
   a destination identifier corresponding to the edge device;
   an exchange identifier corresponding to an exchange being transmitted by the edge device to the destination node; and
   an instruction from a node within the Fibre Channel network to the edge device, the instruction indicating that an exchange originated by the edge device is causing network congestion; and
   implementing a congestion reaction mechanism at the edge device in accordance with the instruction.

2. The method of claim 1, wherein the instruction pertains to the exchange being transmitted by the edge device to the destination node.

3. The method of claim 1, wherein the congestion reaction mechanism is applied to the exchange being transmitted by the edge device to the destination node.

4. A method for controlling network congestion, the method comprising:
 receiving, at a network device that is part of a Fibre Channel network device fabric, a frame having the following:
  a source identifier corresponding to a source node, the source node comprising an edge device outside the Fibre Channel network device fabric;
  a destination identifier corresponding to a destination node; and
  an exchange identifier corresponding to an exchange being transmitted by the source node to the destination node;
 characterizing traffic flow at the Fibre Channel network device; and
 sending an instruction from the Fibre Channel network device to the source node.

5. The method of claim 4, wherein the instruction sent to the source node comprises an Edge Quench message.

6. The method of claim 4, wherein the instruction has a source identifier field corresponding to the destination node, a destination identifier field corresponding to the source node, and an exchange identifier field corresponding to the exchange identifier field.

7. The method of claim 4, wherein the instruction contains network device congestion information.

8. The method of claim 4, wherein the instruction contains network device queue level information.

9. The method of claim 4, wherein the instruction directs the source node to reduce a rate of transmission.

10. The method of claim 9, wherein the exchange of which the rate of transmission is to be reduced is identified by an exchange identifier field of the instruction.

11. A method for controlling traffic flow between a first end node and a second end node through an intermediate node that is part of a Fibre Channel switch fabric, the first end node and the second end node being outside the Fibre Channel switch fabric, the method comprising:
 transmitting a first frame having a source identifier corresponding to the first end node, a destination identifier corresponding to a second end node and a exchange identifier corresponding to a particular exchange being transmitted by the first end node to the second end node;
 receiving a second frame from the intermediate node, the second frame having a source identifier corresponding to the second end node, a destination identifier corresponding to the first end node and an exchange identifier corresponding to the exchange identifier of the first frame, the second frame also including instructions to adjust a current allowed rate for the exchange corresponding to the exchange identifier being transmitted from the first end node to the second end node; and
 adjusting the current allowed rate for the particular exchange from the first end node to the second end node according to the instructions.

12. The method of claim 11, wherein the adjusting step is performed by the first end node.

13. The method of claim 11, wherein the current allowed rate cannot exceed a maximum allowed rate.

14. The method of claim 11, further comprising the step of determining that the second frame is an Edge Quench message.

15. The method of claim 11, wherein the adjusting step comprises decreasing the current allowed rate according to a decrease function.

16. The method of claim 11, wherein the adjusting step comprises increasing the current allowed rate according to an increase function.

17. The method of claim 16, wherein the increase function is dynamically set.

18. The method of claim 16, wherein the increase function is set based on a state of a queue associated with the intermediate node.

19. A device for controlling network congestion, the device comprising:
 means for receiving, at an edge device that is in communication with a Fibre Channel network fabric but is not part of the fabric, a frame having the following:
  a source identifier corresponding to a destination node;
  a destination identifier corresponding to the edge device;
  an exchange identifier corresponding to an exchange being transmitted by the edge device to the destination node; and
  an instruction from a node within the Fibre Channel network device to the edge device, the instruction indicating that an exchange originated by the edge device is causing network congestion; and
 means for implementing a congestion reaction mechanism at the edge device in accordance with the instruction.

20. A device for controlling network congestion, the device comprising:
 means for receiving, at a network device that is part of a Fibre Channel network fabric, a frame having the following:
  a source identifier corresponding to a source node, the source node comprising an edge device outside the Fibre Channel network device fabric;
  a destination identifier corresponding to a destination node; and
  an exchange identifier corresponding to an exchange being transmitted by the source node to the destination node;
 means for characterizing traffic flow at the Fibre Channel network device; and
 means for sending an instruction from the Fibre Channel network device to the source node.

21. A device for controlling network congestion, the device comprising:
 a port for receiving, at a network device that is part of a Fibre Channel network fabric, a frame having the following:
  a source identifier corresponding to a source node, the source node comprising an edge device outside the Fibre Channel network device fabric;
  a destination identifier corresponding to a destination node; and
  an exchange identifier corresponding to an exchange being transmitted by the source node to the destination node; and
 at least one processor configured to characterize traffic flow at the Fibre Channel network device and to send an instruction from the Fibre Channel network device to the source node.

22. A host bus adaptor for controlling network congestion, the host bus adaptor comprising:

a first connection for communicating with a Fibre Channel network device and configured to receive frames comprising the following:
- a source identifier corresponding to a destination node;
- a destination identifier corresponding to the edge device;
- an exchange identifier corresponding to an exchange being transmitted by the edge device to the destination node; and
- an instruction from a node within the Fibre Channel network device to the edge device, the instruction indicating that an exchange originated by the edge device is causing network congestion;

a second connection for communicating with a bus of the edge device; and at least one processor for implementing a congestion reaction mechanism at the edge device in accordance with the instruction.

23. A computer program embodied in a machine-readable medium, the computer program including instructions for controlling one or more devices to alleviate network congestion by performing the following steps:
receiving, at an edge device that is in communication with a Fibre Channel network fabric but is not part of the fabric, a frame having the following:
- a source identifier corresponding to a destination node;
- a destination identifier corresponding to the edge device;
- an exchange identifier corresponding to an exchange being transmitted by the edge device to the destination node; and
- an instruction from a node within the Fibre Channel network device to the edge device, the instruction indicating that an exchange originated by the edge device is causing network congestion; and implementing a congestion reaction mechanism at the edge device in accordance with the instruction.

24. The computer program of claim 23, wherein the instruction pertains to the exchange being transmitted by the edge device to the destination node.

25. The computer program of claim 23, wherein the congestion reaction mechanism is applied to the exchange being transmitted by the edge device to the destination node.

26. A computer program embodied in a machine-readable medium, the computer program including instructions for controlling one or more devices to alleviate network congestion by performing the following steps:
receiving, at a network device that is part of a Fibre Channel network fabric, a frame having the following:
- a source identifier corresponding to a source node, the source node comprising an edge device outside the Fibre Channel network device fabric;
- a destination identifier corresponding to a destination node; and
- an exchange identifier corresponding to an exchange being transmitted by the source node to the destination node;

characterizing traffic flow at the Fibre Channel network device; and sending an instruction from the Fibre Channel network device to the source node.

* * * * *